(12) United States Patent
Ahn

(10) Patent No.: US 11,363,265 B2
(45) Date of Patent: Jun. 14, 2022

(54) METHOD AND DEVICE FOR ENCODING OR DECODING IMAGE

(71) Applicant: DIGITALINSIGHTS INC., Seoul (KR)

(72) Inventor: Yong Jo Ahn, Seoul (KR)

(73) Assignee: DIGITALINSIGHTS INC., Seoul (KR)

( * ) Notice: Subject to any disclaimer, the term of this patent is extended or adjusted under 35 U.S.C. 154(b) by 0 days.

(21) Appl. No.: 17/357,741

(22) Filed: Jun. 24, 2021

(65) Prior Publication Data

US 2021/0321096 A1    Oct. 14, 2021

Related U.S. Application Data

(63) Continuation of application No. PCT/KR2020/003228, filed on Mar. 9, 2020.

(30) Foreign Application Priority Data

Mar. 7, 2019  (KR) .................. 10-2019-0026468
Mar. 14, 2019 (KR) .................. 10-2019-0029186
Mar. 21, 2019 (KR) .................. 10-2019-0032404

(51) Int. Cl.
*H04N 19/117* (2014.01)
*H04N 19/105* (2014.01)
*H04N 19/176* (2014.01)
*H04N 19/82* (2014.01)

(52) U.S. Cl.
CPC ......... *H04N 19/117* (2014.11); *H04N 19/105* (2014.11); *H04N 19/176* (2014.11); *H04N 19/82* (2014.11)

(58) Field of Classification Search
CPC ...... H04N 19/86; H04N 19/117; H04N 19/80; H04N 19/82
See application file for complete search history.

(56) References Cited

U.S. PATENT DOCUMENTS

| 9,774,851 | B2* | 9/2017 | Narroschke | H04N 19/82 |
| 2009/0257664 | A1* | 10/2009 | Kao | H04N 19/117 |
| | | | | 382/232 |
| 2010/0091836 | A1* | 4/2010 | Jia | H04N 19/86 |
| | | | | 375/240.01 |
| 2010/0091878 | A1* | 4/2010 | Jia | H04N 19/436 |
| | | | | 375/240.24 |

(Continued)

FOREIGN PATENT DOCUMENTS

| KR | 10-2016-0068288 | 6/2016 |
| KR | 10-2018-0058649 | 6/2018 |
| KR | 10-2018-0134764 | 12/2018 |

OTHER PUBLICATIONS

International Search Report, Written Opinion, PCT/KR2020/003228 dated Jun. 16, 2020, 10 pgs.

*Primary Examiner* — Daniel Chang
(74) *Attorney, Agent, or Firm* — Morgan, Lewis & Bockius LLP

(57) ABSTRACT

An image encoding/decoding method and apparatus may reconstruct a current picture based on at least one of intra prediction and inter prediction, specify a block boundary to which a deblocking filter is applied in the reconstructed current picture, and apply a deblocking filter to a block boundary based on a filter type pre-defined in an encoding apparatus.

7 Claims, 21 Drawing Sheets

(56) References Cited

U.S. PATENT DOCUMENTS

| | | | |
|---|---|---|---|
| 2010/0091880 A1* | 4/2010 | Jia | H04N 19/44 |
| | | | 375/240.25 |
| 2013/0101027 A1* | 4/2013 | Narroschke | H04N 19/86 |
| | | | 375/240.03 |
| 2013/0251050 A1* | 9/2013 | Ikeda | H04N 19/436 |
| | | | 375/240.29 |
| 2013/0259142 A1* | 10/2013 | Ikeda | H04N 19/80 |
| | | | 375/240.29 |
| 2013/0329782 A1* | 12/2013 | Seregin | H04N 19/117 |
| | | | 375/240.02 |
| 2014/0362921 A1* | 12/2014 | Puri | H04N 19/122 |
| | | | 375/240.16 |
| 2016/0057380 A1* | 2/2016 | Liu | H04N 19/44 |
| | | | 386/254 |
| 2019/0052888 A1 | 2/2019 | Xu et al. | |
| 2019/0052895 A1 | 2/2019 | Narroschke et al. | |
| 2019/0238890 A1* | 8/2019 | Tsai | H04N 19/132 |
| 2021/0152852 A1* | 5/2021 | Andersson | H04N 19/176 |

* cited by examiner

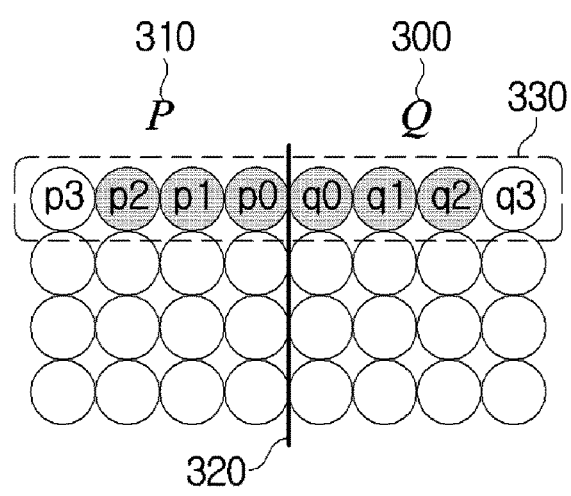
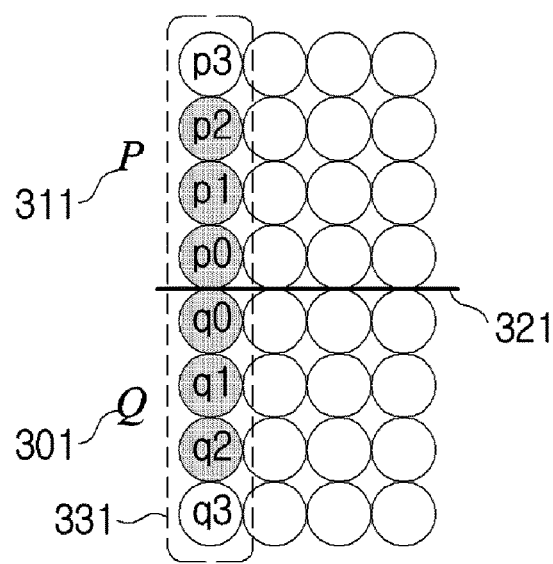
FIG. 3A
FIG. 3B

| merge_data( x0, y0, cbWidth, cbHeight ) { | Descriptor |
|---|---|
|   if ( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     regular_merge_flag[ x0 ][ y0 ] | ae(v) |
|     if( !regular_merge_flag[ x0 ][ y0 ] ) { | |
|       if( cbWidth + cbHeight > 12 ) | |
|         mmvd_flag[ x0 ][ y0 ] | ae(v) |
|       if( mmvd_flag[ x0 ][ y0 ] = = 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( sps_ciip_enabled_flag && sps_triangle_enabled_flag && <br>          MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && sps_triangle_enabled_flag && <br>            cu_skip_flag[ x0 ][ y0 ] = = 0 && <br>              (cbWidth * cbHeight) >= 64 && cbWidth < 128 && cbHeight < 128) | |
|             ciip_flag[ x0 ][ y0 ] | ae(v) |
|           if( ciip_flag[ x0 ][ y0 ] ) { | |
|             if ( cbWidth <= 2 * cbHeight \|\| cbHeight <= 2 * cbWidth ) | |
|               ciip_luma_mpm_flag[ x0 ][ y0 ] | ae(v) |
|             if( ciip_luma_mpm_flag[ x0 ][ y0 ] ) | |
|               ciip_luma_mpm_idx[ x0 ][ y0 ] | ae(v) |
|             if( MaxNumMergeCand > 1 ) | |
|               merge_idx[ x0 ][ y0 ] | ae(v) |
|           } else { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } else if ( MaxNumMergeCand > 1 ) | |
|       merge_idx[ x0 ][ y0 ] | ae(v) |
|   } | |
| } | |

FIG. 16

| merge_data( x0, y0, cbWidth, cbHeight ) { | Descriptor |
|---|---|
|   if ( CuPredMode[ x0 ][ y0 ] != MODE_IBC ) | |
|     regular_merge_flag[ x0 ][ y0 ] | ae(v) |
|   if( !regular_merge_flag[ x0 ][ y0 ] ) { | |
|     if( cbWidth + cbHeight > 12 ) | |
|       mmvd_flag[ x0 ][ y0 ] | ae(v) |
|     if( mmvd_flag[ x0 ][ y0 ] == 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( sps_ciip_enabled_flag && sps_triangle_enabled_flag && <br>      MaxNumSubblockMergeCand > 0 && cbWidth >= 8 && cbHeight >= 8 ) | |
|         merge_subblock_flag[ x0 ][ y0 ] | ae(v) |
|       if( merge_subblock_flag[ x0 ][ y0 ] == 1 ) { | |
|         if( MaxNumSubblockMergeCand > 1 ) | |
|           merge_subblock_idx[ x0 ][ y0 ] | ae(v) |
|       } else { | |
|         if( sps_ciip_enabled_flag && sps_triangle_enabled_flag && <br>        cu_skip_flag[ x0 ][ y0 ] == 0 && <br>        ( cbWidth * cbHeight ) >= 64 && cbWidth < 128 && cbHeight < 128 ) | |
|           ciip_flag[ x0 ][ y0 ] | ae(v) |
|         if( ciip_flag[ x0 ][ y0 ] ) { | |
|           if ( cbWidth <= 2 * cbHeight \|\| cbHeight <= 2 * cbWidth ) | |
|             ciip_luma_mpm_flag[ x0 ][ y0 ] | ae(v) |
|           if( ciip_luma_mpm_flag[ x0 ][ y0 ] ) | |
|             ciip_luma_mpm_idx[ x0 ][ y0 ] | ae(v) |
|           if( MaxNumMergeCand > 1 ) | |
|             merge_idx[ x0 ][ y0 ] | ae(v) |
|         } else { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } else if ( MaxNumMergeCand > 1 ) | |
|     merge_idx[ x0 ][ y0 ] | ae(v) |
| } | |

FIG. 17

| merge_data( x0, y0, cbWidth, cbHeight ) { | Descriptor |
|---|---|
|   if ( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     regular_merge_flag[ x0 ][ y0 ] | ae(v) |
|     if( !regular_merge_flag[ x0 ][ y0 ] ) { | |
|       if( cbWidth + cbHeight > 12 ) | |
|         mmvd_flag[ x0 ][ y0 ] | ae(v) |
|       if( mmvd_flag[ x0 ][ y0 ] = = 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( (sps_ciip_enabled_flag \|\| sps_triangle_enabled_flag) && MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] = = 0 && sps_triangle_enabled_flag && tile_group_type = = B && ( cbWidth * cbHeight ) >= 64 && cbWidth < 128 && cbHeight < 128 ) | |
|             ciip_flag[ x0 ][ y0 ] | ae(v) |
|           if( ciip_flag[ x0 ][ y0 ] ) { | |
|             if ( cbWidth <= 2 * cbHeight \|\| cbHeight <= 2 * cbWidth ) | |
|               ciip_luma_mpm_flag[ x0 ][ y0 ] | ae(v) |
|             if( ciip_luma_mpm_flag[ x0 ][ y0 ] ) | |
|               ciip_luma_mpm_idx[ x0 ][ y0 ] | ae(v) |
|             if( MaxNumMergeCand > 1 ) | |
|               merge_idx[ x0 ][ y0 ] | ae(v) |
|           } else { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } else if ( MaxNumMergeCand > 1 ) | |
|       merge_idx[ x0 ][ y0 ] | ae(v) |
|   } | |
| } | |

FIG. 18

| merge_data( x0, y0, cbWidth, cbHeight ) { | Descriptor |
|---|---|
|   if ( CuPredMode[ x0 ][ y0 ] != MODE_IBC ) | |
|     regular_merge_flag[ x0 ][ y0 ] | ae(v) |
|   if( !regular_merge_flag[ x0 ][ y0 ] ) { | |
|     if( cbWidth + cbHeight > 12 ) | |
|       mmvd_flag[ x0 ][ y0 ] | ae(v) |
|     if( mmvd_flag[ x0 ][ y0 ] = = 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( (sps_ciip_enabled_flag \|\| sps_triangle_enabled_flag) && MaxNumSubblockMergeCand > 0 && cbWidth >= 8 && cbHeight >= 8 ) | |
|         merge_subblock_flag[ x0 ][ y0 ] | ae(v) |
|       if( merge_subblock_flag[ x0 ][ y0 ] = = 1 ) { | |
|         if( MaxNumSubblockMergeCand > 1 ) | |
|           merge_subblock_idx[ x0 ][ y0 ] | ae(v) |
|       } else { | |
|         if( sps_ciip_enabled_flag && cu_skip_flag[ x0 ][ y0 ] = = 0 && (sps_triangle_enabled_flag && tile_group_type = = B) && ( cbWidth * cbHeight ) >= 64 && cbWidth < 128 && cbHeight < 128 ) | |
|           ciip_flag[ x0 ][ y0 ] | ae(v) |
|         if( ciip_flag[ x0 ][ y0 ] ) { | |
|           if ( cbWidth <= 2 * cbHeight \|\| cbHeight <= 2 * cbWidth ) | |
|             ciip_luma_mpm_flag[ x0 ][ y0 ] | ae(v) |
|           if( ciip_luma_mpm_flag[ x0 ][ y0 ] ) | |
|             ciip_luma_mpm_idx[ x0 ][ y0 ] | ae(v) |
|           if( MaxNumMergeCand > 1 ) | |
|             merge_idx[ x0 ][ y0 ] | ae(v) |
|         } else { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } else if ( MaxNumMergeCand > 1 ) | |
|     merge_idx[ x0 ][ y0 ] | ae(v) |
| } | |

FIG. 19

| merge_data( x0, y0, cbWidth, cbHeight ) { | Descriptor |
|---|---|
|   if ( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     regular_merge_flag[ x0 ][ y0 ] | ae(v) |
|     if( !regular_merge_flag[ x0 ][ y0 ] ) { | |
|       if( cbWidth + cbHeight > 12 ) | |
|         mmvd_flag[ x0 ][ y0 ] | ae(v) |
|       if( mmvd_flag[ x0 ][ y0 ] = = 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8) | |
|           merge_subblock_flag[ x0 ][ y0 ] | ae(v) |
|         if( merge_subblock_flag[ x0 ][ y0 ] = = 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] = = 0 && <br>( cbWidth * cbHeight ) >= 64 && cbWidth < 128 && cbHeight < 128 ) | |
|             ciip_flag[ x0 ][ y0 ] | ae(v) |
|           if( ciip_flag[ x0 ][ y0 ] ) { | |
|             if ( cbWidth <= 2 * cbHeight  \|\|  cbHeight <= 2 * cbWidth) | |
|               ciip_luma_mpm_flag[ x0 ][ y0 ] | ae(v) |
|             if( ciip_luma_mpm_flag[ x0 ][ y0 ] ) | |
|               ciip_luma_mpm_idx[ x0 ][ y0 ] | ae(v) |
|             if( MaxNumMergeCand > 1 ) | |
|               merge_idx[ x0 ][ y0 ] | ae(v) |
|           } else { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } else if ( MaxNumMergeCand > 1 ) | |
|       merge_idx[ x0 ][ y0 ] | ae(v) |
|   } | |
| } | |

FIG. 20

| merge_data( x0, y0, cbWidth, cbHeight ) { | Descriptor |
|---|---|
|   if ( CuPredMode[ x0 ][ y0 ] != MODE_IBC ) | |
|     regular_merge_flag[ x0 ][ y0 ] | ae(v) |
|   if( !regular_merge_flag[ x0 ][ y0 ] ) { | |
|     if( cbWidth + cbHeight > 12 ) | |
|       mmvd_flag[ x0 ][ y0 ] | ae(v) |
|     if( mmvd_flag[ x0 ][ y0 ] == 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( MaxNumSubblockMergeCand > 0 && cbWidth >= 8 && cbHeight >= 8) | |
|         merge_subblock_flag[ x0 ][ y0 ] | ae(v) |
|       if( merge_subblock_flag[ x0 ][ y0 ] == 1 ) { | |
|         if( MaxNumSubblockMergeCand > 1 ) | |
|           merge_subblock_idx[ x0 ][ y0 ] | ae(v) |
|       } else { | |
|         if( sps_ciip_enabled_flag && cu_skip_flag[ x0 ][ y0 ] == 0 && ( cbWidth * cbHeight ) >= 64 && cbWidth < 128 && cbHeight < 128 ) | |
|           ciip_flag[ x0 ][ y0 ] | ae(v) |
|         if( ciip_flag[ x0 ][ y0 ] ) { | |
|           if ( cbWidth <= 2 * cbHeight || cbHeight <= 2 * cbWidth ) | |
|             ciip_luma_mpm_flag[ x0 ][ y0 ] | ae(v) |
|           if( ciip_luma_mpm_flag[ x0 ][ y0 ] ) | |
|             ciip_luma_mpm_idx[ x0 ][ y0 ] | ae(v) |
|           if( MaxNumMergeCand > 1 ) | |
|             merge_idx[ x0 ][ y0 ] | ae(v) |
|         } else { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } else if ( MaxNumMergeCand > 1 ) | |
|     merge_idx[ x0 ][ y0 ] | ae(v) |
| } | |

FIG. 21

METHOD AND DEVICE FOR ENCODING OR DECODING IMAGE

RELATED APPLICATIONS

This application is a continuation application of the PCT Application No. PCT/KR2020/003228, filed Mar. 9, 2020, which claims the benefit of, and priority to, Korean Patent Application No. 10-2019-0026468, filed Mar. 7, 2019; Korean Patent Application No. 10-2019-0029186, filed Mar. 14, 2019; and Korean Patent Application No. 10-2019-0032404, filed Mar. 21, 2019, all of which are incorporated by reference herein in their entireties.

TECHNICAL FIELD

The present disclosure relates to a video encoding/decoding method and apparatus.

BACKGROUND ART

As a demand for high-resolution and high-definition video has recently increased, a need for a high-efficiency video compression technology for next-generation video services has emerged. Based on this need, ISO/IEC MPEG and ITU-T VCEG, which jointly standardized H.264/AVC and HEVC video compression standards, formed JVET (Joint Video Exploration Team) and conducted research and exploration to establish a new video compression standard from October 2015. In April 2018, a new video compression standardization was started with an evaluation of a responses to a new video compression standard CfP (Call for Proposal).

In a video compression technique, a block division structure means a unit that performs encoding and decoding, and a unit to which major encoding and decoding techniques such as prediction and transformation are applied. As video compression technology develops, the size of blocks for encoding and decoding is gradually increasing, and more various division types are supported as a block division type. In addition, video compression is performed using not only units for encoding and decoding, but also units subdivided according to the role of blocks.

In the HEVC standard, video encoding and decoding are performed using a unit block subdivided according to a quad-tree type block division structure and a role for pre-diction and transformation. In addition to the quad-tree type block division structure, various types of block division structures such as QTBT (Quad Tree plus Binary Tree) in the form of combining a quad-tree and a binary-tree, and MTT (Multi-Type Tree) in which a triple-tree is combined therewith have been proposed to improve video coding efficiency. Through the support of various block sizes and various types of block division structures, one picture is divided into multiple blocks, and information in units of coding units such as a coding mode, motion information, and intra prediction direction information corresponding to each block is expressed in various ways, so the number of bits expressing this is increasing significantly.

DISCLOSURE

Technical Problem

An image encoding/decoding method and apparatus according to the present disclosure provides an in-loop filtering method for a reconstructed picture.

An image encoding/decoding method and apparatus according to the present disclosure provides a motion compensation method according to a plurality of inter prediction modes.

Technical Solution

An image encoding/decoding method and apparatus according to the present disclosure may reconstruct a current picture based on at least one of intra prediction or inter prediction, specify a block boundary to which a deblocking filter is applied in the reconstructed current picture, and apply the deblocking filter to the specified block boundary based on a filter type pre-defined in the encoding/decoding apparatus.

In the image encoding/decoding method and apparatus according to the present disclosure, the deblocking filter may be applied in units of a predetermined M×N sample grid, where M and N may be integers of 4, 8 or more.

In the image encoding/decoding method and apparatus according to the present disclosure, the encoding/decoding apparatus may define a plurality of filter types having different filter lengths, and the plurality of filter types may include at least one of a long filter, a middle filter, or a short filter.

In the image encoding/decoding method and apparatus according to the present disclosure, the filter length of the long filter may be 8, 10, 12 or 14, the filter length of the middle filter may be 6, and the filter length of the short filter may be 2 or 4.

In the image encoding/decoding method and apparatus according to the present disclosure, the number of pixels to which the deblocking filter is applied in a P block may be different from the number of pixels to which the deblocking filter is applied in a Q block, wherein the P block and the Q block may be adjacent blocks in both directions from the specified block boundary.

In the image encoding/decoding method and apparatus according to the present disclosure, the number of pixels to which the deblocking filter is applied in the P block may be 3, and the number of pixels to which the deblocking filter is applied in the Q block may be 7.

In the image encoding/decoding method and apparatus according to the present disclosure, the step of reconstructing the current picture comprises: constructing a merge candidate list of a current block, deriving motion information of the current block from the merge candidate list, and performing motion compensation of the current block based on the motion information.

In the image encoding/decoding method and apparatus according to the present disclosure, the motion compensation of the current block may be performed based on a predetermined reference region according to the current picture referencing mode.

In the image encoding/decoding method and apparatus according to the present disclosure, a motion vector among the derived motion information may be corrected using a motion vector difference value for a merge mode.

In the image encoding/decoding method and apparatus according to the present disclosure, the correction of the motion vector may be performed only when a size of the current block is greater than a predetermined threshold size.

Advantageous Effects

In the present disclosure, the efficiency of in-loop filtering can be improved by applying the in-loop filter in units of a predetermined sample grid, but considering the boundary between prediction/transform blocks or subblocks thereof.

In addition, the present disclosure can efficiently remove artifacts on the boundary by filtering the block boundary based on in-loop filters having different filter lengths.

In addition, the present disclosure can improve the efficiency of motion compensation by adaptively using a plurality of inter prediction modes according to predetermined priorities.

Also, according to the present disclosure, the encoding efficiency of the current picture referencing mode can be improved by adaptively using the reference region according to the current picture referencing mode.

In addition, the present disclosure can increase the accuracy of inter prediction parameters for the merge mode and improve the encoding efficiency of the merge mode by selectively using the merge mode based on the motion vector difference value.

DESCRIPTION OF DRAWINGS

FIG. 3 illustrates a target boundary and a target pixel of a deblocking filter according to an embodiment to which the present disclosure is applied.

FIGS. 16 to 21 illustrate a method of determining an inter prediction mode of a current block based on a predetermined priority according to an embodiment to which the present disclosure is applied.

BEST MODE FOR INVENTION

Figure 1:
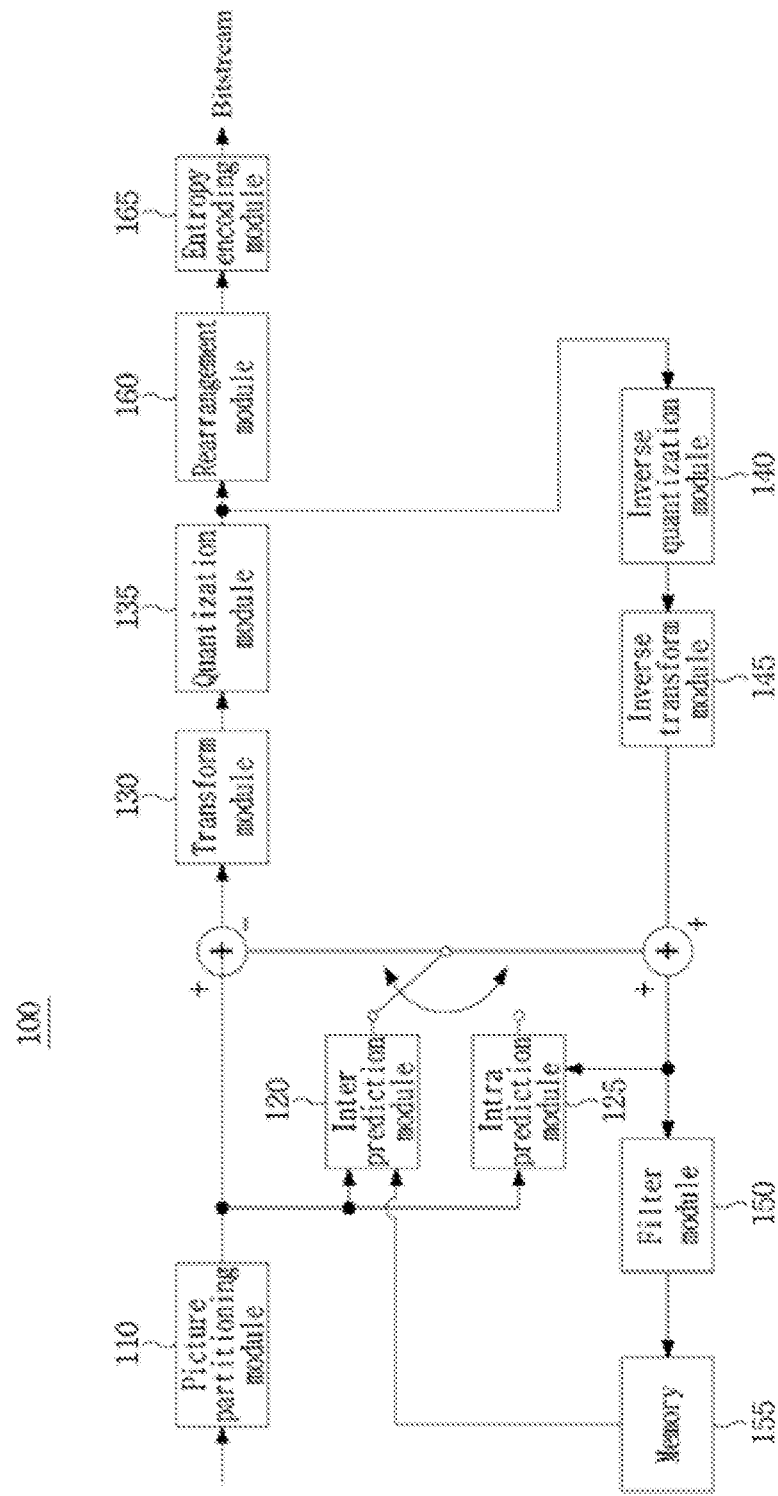
FIG. 1 is a block diagram showing an image encoding apparatus according to the present disclosure.

An image encoding/decoding method and apparatus according to the present disclosure may reconstruct a current picture based on at least one of intra prediction or inter prediction, specify a block boundary to which a deblocking filter is applied in the reconstructed current picture, and apply the deblocking filter to the specified block boundary based on a filter type pre-defined in the encoding/decoding apparatus.

In the image encoding/decoding method and apparatus according to the present disclosure, the deblocking filter may be applied in units of a predetermined M×N sample grid, where M and N may be integers of 4, 8 or more.

In the image encoding/decoding method and apparatus according to the present disclosure, the encoding/decoding apparatus may define a plurality of filter types having different filter lengths, and the plurality of filter types may include at least one of a long filter, a middle filter, or a short filter.

In the image encoding/decoding method and apparatus according to the present disclosure, the filter length of the long filter may be 8, 10, 12 or 14, the filter length of the middle filter may be 6, and the filter length of the short filter may be 2 or 4.

In the image encoding/decoding method and apparatus according to the present disclosure, the number of pixels to which the deblocking filter is applied in a P block may be different from the number of pixels to which the deblocking filter is applied in a Q block, wherein the P block and the Q block may be adjacent blocks in both directions from the specified block boundary.

In the image encoding/decoding method and apparatus according to the present disclosure, the number of pixels to which the deblocking filter is applied in the P block may be 3, and the number of pixels to which the deblocking filter is applied in the Q block may be 7.

In the image encoding/decoding method and apparatus according to the present disclosure, the step of reconstructing the current picture comprises: constructing a merge candidate list of a current block, deriving motion information of the current block from the merge candidate list, and performing motion compensation of the current block based on the motion information.

In the image encoding/decoding method and apparatus according to the present disclosure, the motion compensation of the current block may be performed based on a predetermined reference region according to the current picture referencing mode.

In the image encoding/decoding method and apparatus according to the present disclosure, a motion vector among the derived motion information may be corrected using a motion vector difference value for a merge mode.

In the image encoding/decoding method and apparatus according to the present disclosure, the correction of the motion vector may be performed only when a size of the current block is greater than a predetermined threshold size.

MODE FOR INVENTION

Hereinafter, embodiments of the present disclosure will be described in detail with reference to the accompanying drawings in the present specification so that those of ordinary skill in the art may easily implement the present disclosure. However, the present disclosure may be implemented in various different forms and is not limited to the embodiments described herein. In the drawings, parts irrelevant to the description are omitted in order to clearly describe the present disclosure, and similar reference numerals are attached to similar parts throughout the specification.

Throughout this specification, when a certain part is said to be 'connected' with another part, this includes not only the case where it is directly connected, but also the case where it is electrically connected with another element in the middle. In addition, in the entire specification, when a certain part "includes" a certain component, it means that other components may be further included rather than excluding other components unless otherwise stated.

The terms 'step (to)~' or 'step of ~' as used throughout this specification does not mean 'step for ~'. In addition, terms such as first and second may be used to describe various elements, but the elements should not be limited to the terms. The above terms are used only for the purpose of distinguishing one component from another component.

In addition, the components shown in the embodiment of the present disclosure are shown independently to represent different characteristic functions, it does not mean that each component is made of separate hardware or a single software component unit. That is, each component unit is described by being listed as a respective component unit for convenience of description, and at least two of the component units are combined to form one component unit, or one component unit may be divided into a plurality of component units to perform a function. An integrated embodiment and a separate embodiment of each of these components are also included in the scope of the present disclosure as long as they do not depart from the essence of the present disclosure.

In the various embodiments of the present disclosure described herein below, terms such as "~unit", "~group", "~unit", "~module", and "~block" mean units that process at least one function or operation, and they may be implemented in hardware or software, or a combination of hardware and software.

In addition, a coding block refers to a processing unit of a set of target pixels on which encoding and decoding are currently performed, and may be used interchangeably as a coding block and a coding unit. In addition, the coding unit refers to a coding unit (CU) and may be generically referred to including a coding block (CB).

In addition, quad-tree division refers to that one block is divided into four independent coding units, and binary division refers to that one block is divided into two independent coding units. In addition, ternary division refers to that one block is divided into three independent coding units in a 1:2:1 ratio.

FIG. 1 is a block diagram showing an image encoding apparatus according to the present disclosure.

Referring to FIG. 1, a video encoding apparatus 100 may include: a picture dividing module 110, prediction modules 120 and 125, a transform module 130, a quantization module 135, a rearrangement module 160, an entropy encoding module 165, an inverse quantization module 140, an inverse transform module 145, a filter module 150, and a memory 155.

A picture dividing module 110 may divide an input picture into one or more processing units. Herein, the processing unit may be a prediction unit (PU), a transform unit (TU), or a coding unit (CU). Hereinafter, in an embodiment of the present disclosure, a coding unit may be used as a unit that performs encoding or a unit that performs decoding.

A prediction unit may be resulting from dividing one coding unit into at least one square or non-square of the same size, and it may be divided such that one prediction unit among prediction units divided within one coding unit has a different shape and/or size from another prediction unit. When it is not a minimum coding unit in generating a prediction unit which performs intra prediction based on a coding unit, intra prediction may be performed without dividing the coding unit into a plurality of prediction units N×N.

Prediction modules 120 and 125 may include an inter prediction module 120 performing inter prediction and an intra prediction module 125 performing intra prediction. Whether to perform inter prediction or intra prediction for a prediction unit may be determined, and detailed information (e.g., an intra prediction mode, a motion vector, a reference picture, etc.) according to each prediction method may be determined. A residual value (residual block) between a generated prediction block and an original block may be input to a transform module 130. In addition, prediction mode information, motion vector information, etc. used for prediction may be encoded together with a residual value by an entropy encoding module 165 and may be transmitted to a decoder. However, when a motion information derivation technique from the side of a decoder according to the present disclosure is applied, since an encoder does not generate prediction mode information and motion vector information, the corresponding information is not transmitted to the decoder. On the other hand, it is possible for an encoder to signal and transmit information indicating that motion information is derived and used from the side of a decoder and information on a technique used for inducing the motion information.

A inter prediction module 120 may predict a prediction unit based on information of at least one of a previous picture or a subsequent picture of a current picture, or may predict a prediction unit based on information of some encoded regions in the current picture, in some cases. As the inter prediction mode, various methods such as a merge mode, an advanced motion vector prediction (AMVP) mode, an affine mode, a current picture referencing mode, and a combined prediction mode may be used. In the merge mode, at least one motion vector among spatial/temporal merge candidates may be set as a motion vector of the current block, and inter prediction may be performed using the set motion vector. However, even in the merge mode, the preset motion vector may be corrected by adding an additional motion vector difference value (MVD) to the preset motion vector. In this case, the corrected motion vector may be used as the final motion vector of the current block, which will be described in detail with reference to FIG. 15. The affine mode is a method of dividing a current block into predetermined sub-block units and performing inter prediction using a motion vector derived for each sub-block unit. Here, the sub-block unit is represented by N×M, and N and M may be integers of 4, 8, 16 or more, respectively. The shape of the sub-block may be square or non-square. The sub-block unit may be a fixed one that is pre-promised to the encoding apparatus, or may be variably determined in consideration of the size/shape of the current block, the component type, and the like. The current picture referencing mode is an inter prediction method using a pre-reconstructed region in the current picture to which the current block belongs and a predetermined block vector, which will be described in detail with reference to FIGS. 9 to 14. In the combined prediction mode, a first prediction block through inter prediction and a second prediction block through intra prediction are respectively generated for one current block, and a predetermined weight is applied to the first and second prediction blocks to generate the final prediction block of the current block. Here, the inter prediction may be performed using any one of the above-described inter prediction modes. The intra prediction may be performed using only an intra prediction mode (e.g., any one of a planar mode, a DC mode, a vertical/horizontal mode, and a diagonal mode) preset in the encoding apparatus. Alternatively, the intra prediction mode for the intra prediction may be derived based on the intra prediction mode of a neighboring block (e.g., at least one of left, top, top-left, top-right, and bottom-right) adjacent to the current block. In this case, the number of neighboring blocks to be used may be fixed to one or two, or may be three or more. Even when all of the above-described neighboring blocks are available, only one of the left neighboring block or the top neighboring block may be limited to be used, or only the left and top neighboring blocks may be limited to be used. The weight may be determined in consideration of whether the aforementioned neighboring block is a block coded in an intra-mode. It is assumed that a weight w1 is applied to the first prediction block and a weight w2 is applied to the second prediction block. In this case, when both the left/top neighboring blocks are blocks coded in the intra mode, w1 may be a natural number less than w2. For example, a ratio of w1 and w2 may be [1:3]. When neither of the left/top neighboring blocks is a block coded in the intra mode, w1 may be a natural number greater than w2. For example, a ratio of w1 and w2 may be [3:1]. When only one of the left/top neighboring blocks is a block coded in the intra mode, w1 may be set to be the same as w2.

The inter prediction module 120 may include a reference picture interpolation module, a motion prediction module, and a motion compensation module.

A reference picture interpolation module may receive reference picture information from a memory 155 and may generate pixel information on an integer pixel or less than the integer pixel from the reference picture. In the case of luma pixels, an 8-tap DCT-based interpolation filter having different filter coefficients may be used to generate pixel information on an integer pixel or less than the integer pixel in a unit of a ¼ pixel. In the case of chroma signals, a 4-tap DCT-based interpolation filter having different filter coefficients may be used to generate pixel information on an integer pixel or less than the integer pixel in a unit of a ⅛ pixel.

A motion prediction module may perform motion prediction based on a reference picture interpolated by a reference picture interpolation module. As a method for obtaining a motion vector, various methods such as a full search-based block matching algorithm (FBMA), a three step search (TSS), and a new three-step search algorithm (NTS) may be used. A motion vector may have a motion vector value in a unit of a ½ pixel or a ¼ pixel based on an interpolated pixel. A motion prediction module may predict a current prediction unit by using various motion prediction methods.

An intra prediction module 125 may generate a prediction unit based on reference pixel information neighboring to a current block which is pixel information in the current picture. When a neighboring block of a current prediction unit is a block on which inter prediction has been performed and a reference pixel is a pixel on which inter prediction has been performed, a reference pixel included in a block on which inter prediction has been performed may be replaced with reference pixel information of a neighboring block on which intra prediction has been performed. In other words, when a reference pixel is not available, information on a reference pixel that is not available may be replaced with at least one reference pixel among available reference pixels.

In addition, a residual block including residual information that is a difference between a prediction unit on which prediction has been performed based on the prediction unit generated by prediction modules 120 and 125 and an original block of the prediction unit may be generated. The generated residual block may be input to a transform module 130.

A transform module 130 may transform a residual block including residual information between an original block and a prediction unit generated by prediction modules 120 and 125 using a transform method such as discrete cosine transform (DCT), discrete sine transform (DST), and KLT. Whether to apply DCT, DST, or KLT in order to transform a residual block may be determined based on intra prediction mode information of a prediction unit used to generate a residual block.

A quantization module 135 may quantize values transformed to a frequency domain by a transform module 130. Quantization coefficients may vary depending on a block or importance of a picture. The values calculated by a quantization module 135 may be provided to an inverse quantization module 140 and a rearrangement module 160.

A rearrangement module 160 may rearrange coefficient values on quantized residual values.

A rearrangement module 160 may change coefficients in the form of a two-dimensional block into coefficients in the form of a one-dimensional vector through a coefficient scanning method. For example, a rearrangement module 160 may scan from DC coefficients to coefficients in a high frequency domain using zig-zag scanning method so as to change the coefficients to be in the form of a one-dimensional vector. Depending on a size of a transform unit and an intra prediction mode, vertical scanning where coefficients in the form of a two-dimensional block are scanned in a column direction or horizontal scanning where coefficients in the form of a two-dimensional block are scanned in a row direction may be used instead of zig-zag scanning. In other words, which scanning method among zig-zag scanning, vertical scanning, and horizontal scanning is used may be determined depending on a size of a transform unit and an intra prediction mode.

An entropy encoding module 165 may perform entropy encoding based on values calculated by a rearrangement module 160. Entropy encoding may use various encoding methods such as Exponential Golomb, Context-Adaptive Variable Length Coding (CAVLC), and Context-Adaptive Binary Arithmetic Coding (CABAC). In relation to this, an entropy encoding module 165 may encode residual value coefficient information of a coding unit from a rearrangement module 160 and prediction modules 120 and 125. In addition, according to the present disclosure, information indicating that motion information is derived and used at a decoder side and information on a technique used to derive motion information may be signaled and transmitted.

An inverse quantization module 140 and an inverse transform module 145 may inversely quantize values quantized by a quantization module 135 and inversely transform values transformed by a transform module 130. A residual value generated by an inverse quantization module 140 and an inverse transform module 145 may be combined with a prediction unit predicted through a motion prediction module, motion compensation module, and intra prediction module included in prediction modules 120 and 125 to generate a reconstructed block.

A filter module 150 may include at least one of a deblocking filter, an offset correction module, or an adaptive loop filter (ALF). A deblocking filter may remove block distortion that occurs due to boundaries between blocks in a reconstructed picture, which will be described with reference to FIGS. 3 to 8. An offset correction module may correct offset with respect to an original image in a unit of a pixel in a deblocking filtered image. In order to perform offset correction on a particular picture, a method of applying offset in consideration of edge information of each pixel or a method of partitioning pixels included in an image into the predetermined number of regions, determining a region to be subjected to perform offset, and applying the offset to the determined region may be used. Adaptive loop filtering (ALF) may be performed based on a value obtained by comparing a filtered reconstructed image and an original image. After partitioning pixels included in an image into predetermined groups, one filter to be applied to the corresponding group may be determined, and filtering may be performed differentially for each group.

A memory 155 may store a reconstructed block or picture calculated through a filter module 150. The stored reconstructed block or picture may be provided to prediction modules 120 and 125 in performing inter prediction.

Figure 2:
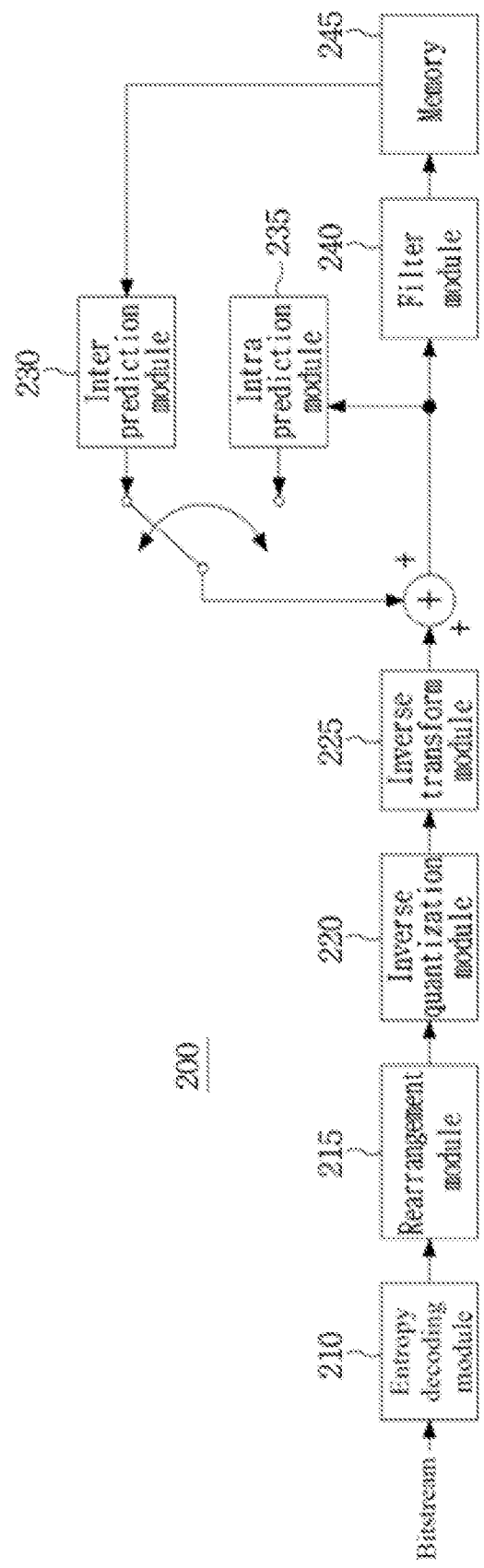
FIG. 2 is a block diagram showing an image decoding apparatus according to the present disclosure.

FIG. 2 is a block diagram showing an image decoding apparatus according to the present disclosure.

Referring to FIG. 2, an apparatus 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input to an apparatus for decoding a video, the input bitstream may be decoded according to an inverse process of an apparatus for encoding a video.

An entropy decoding module 210 may perform entropy decoding according to an inverse process of entropy encoding by an entropy encoding module of a video encoding apparatus. For example, corresponding to methods performed by a video encoding apparatus, various methods such as Exponential Golomb, Context-Adaptive Variable Length Coding (CAVLC), and Context-Adaptive Binary Arithmetic Coding (CABAC) may be applied.

An entropy decoding module 210 may decode information on intra prediction and inter prediction performed by an encoding apparatus.

A rearrangement module 215 may perform rearrangement on a bitstream entropy decoded by an entropy decoding module 210 based on a rearrangement method used in an encoding apparatus. A rearrangement module may reconstruct and rearrange coefficients in the form of a one-dimensional vector to coefficients in the form of a two-dimensional block.

An inverse quantization module 220 may perform inverse quantization based on a quantization parameter received from an encoding apparatus and rearranged coefficients of a block.

An inverse transform module 225 may perform inverse transform, i.e., inverse DCT, inverse DST, and inverse KLT, which corresponds to a transform, i.e., DCT, DST, and KLT, performed by a transform module, on a quantization result by an apparatus for encoding a video. Inverse transform may be performed based on a transmission unit determined by a video encoding apparatus. In an inverse transform module 225 of a video decoding apparatus, transform schemes (e.g., DCT, DST, and KLT) may be selectively performed depending on multiple pieces of information such as a prediction method, a size of a current block, and a prediction direction.

Prediction modules 230 and 235 may generate a prediction block based on information on prediction block generation received from an entropy decoding module 210 and information on a previously decoded block or picture received from a memory 245.

As described above, if a size of a prediction unit and a size of a transform unit are the same when intra prediction is performed in the same manner as an operation of a video encoding apparatus, intra prediction may be performed on a prediction unit based on pixels existing on the left, upper left, and top of a prediction unit. However, if the size of the prediction unit and the size of the transform unit are different when the intra prediction is performed, intra prediction may be performed using a reference pixel based on a transform unit. In addition, intra prediction using N×N division may be used only for the minimum coding unit.

Prediction modules 230 and 235 may include a prediction unit determination module, an inter prediction module, and an intra prediction module. A prediction unit determination module may receive a variety of information, such as prediction unit information, prediction mode information of an intra prediction method, and information on motion prediction of an inter prediction method, from an entropy decoding module 210, may divide a current coding unit into prediction units, and may determine whether inter prediction or intra prediction is performed on the prediction unit. On the other hand, if an encoder 100 does not transmit information related to motion prediction for inter prediction, but transmit motion information indicating that motion information is derived and used from the side of a decoder and information about a technique used for deriving motion information, the prediction unit determination module determines prediction performance of an inter prediction module 230 based on the information transmitted from the encoder 100.

An inter prediction module 230 may perform inter prediction on a current prediction unit based on information of at least one of a previous picture or a subsequent picture of the current picture including the current prediction unit using information required for inter prediction of the current prediction unit provided by a video encoding apparatus. In order to perform inter prediction, an inter prediction mode of a prediction unit included in a corresponding coding unit may be determined based on the coding unit. With respect to the inter prediction mode, the aforementioned merge mode, AMVP mode, affine mode, current picture referencing mode, combined prediction mode, etc. may be equally used in the decoding apparatus, and a detailed description thereof will be omitted herein. The inter prediction module 230 may determine the inter prediction mode of the current prediction unit with a predetermined priority, which will be described with reference to FIGS. 16 to 18.

An intra prediction module 235 may generate a prediction block based on pixel information in a current picture. When a prediction unit is a prediction unit subjected to intra prediction, intra prediction may be performed based on intra prediction mode information of the prediction unit received from a video encoding apparatus. An intra prediction module 235 may include an adaptive intra smoothing (AIS) filter, a reference pixel interpolation module, and a DC filter. An AIS filter performs filtering on a reference pixel of a current block, and whether to apply the filter may be determined depending on a prediction mode of a current prediction unit. AIS filtering may be performed on a reference pixel of a current block by using a prediction mode of a prediction unit and AIS filter information received from an apparatus for encoding a video. When a prediction mode of a current block is a mode where AIS filtering is not performed, an AIS filter may not be applied.

When a prediction mode of a prediction unit is a prediction unit that performs intra prediction based on a pixel value interpolated by a reference pixel, a reference pixel interpolation module may interpolate a reference pixel to generate a reference pixel in a unit of pixel equal to an integer pixel or less than the integer pixel. When a prediction mode of a current prediction unit is a prediction mode in which a prediction block is generated without interpolating a reference pixel, a reference pixel may not be interpolated. A DC filter may generate a prediction block through filtering when a prediction mode of a current block is a DC mode.

A reconstructed block or picture may be provided to a filter module 240. A filter module 240 may include a deblocking filter, an offset correction module, and an ALF.

A deblocking filter of a video decoding apparatus may receive information on a deblocking filter from a video encoding apparatus, and may perform deblocking filtering on a corresponding block. This will be described with reference to FIGS. 3 to 8.

An offset correction module may perform offset correction on a reconstructed image based on a type of offset correction and offset value information applied to an image in performing encoding. An ALF may be applied to a coding unit based on information on whether to apply the ALF, ALF coefficient information, etc. received from an encoding apparatus. The ALF information may be provided as being included in a particular parameter set.

A memory 245 may store a reconstructed picture or block for use as a reference picture or block, and may provide a reconstructed picture to an output module.

FIG. 3 illustrates a target boundary and a target pixel of a deblocking filter according to an embodiment to which the present disclosure is applied.

FIG. 3 is a diagram illustrating block boundaries 320 and 321 between two different blocks (P block and Q block), and the block boundary may be classified into a vertical boundary and a horizontal boundary.

In FIG. 3, the Q block region refers to the region of the current target block in which encoding and/or decoding is performed, and the P block region refers to a previously reconstructed block that has been reconstructed and is spatially adjacent to the Q block. The P block and the Q block are pre-reconstructed blocks, the Q block may mean a region in which deblocking filtering is currently performed, and the P block may mean a block spatially adjacent to the Q block.

FIG. 3 is a diagram conceptually illustrating a P block region and a Q block region to which a deblocking filter is applied, and illustrates an embodiment of pixels positioned at a boundary between a P block and a Q block to which a deblocking filter is applied. Therefore, the number of pixels to which the deblocking filter proposed in the present disclosure is applied (hereinafter, the number of target pixels) and the number of taps of the deblocking filter are not limited to FIG. 3, and the number of target pixels for each of the P and Q blocks from the boundary between the P block and the Q block may be 1, 2, 3, 4, 5, 6, 7 or more. The number of target pixels of the P block may be equal to or different from the number of target pixels of the Q block. For example, the number of target pixels in the P block may be 5, and the number of target pixels in the Q block may be 5. Alternatively, the number of target pixels in the P block may be 7, and the number of target pixels in the Q block may be 7. Alternatively, the number of target pixels in the P block may be 3, and the number of target pixels in the Q block may be 7.

In FIG. 3, a case in which the number of target pixels of a P block and a Q block is 3, respectively will be described as an embodiment.

An example in which the deblocking filter is applied to the first row 330 of the Q block region 300 is shown among the embodiments for the vertical boundary shown in FIG. 3.

Among the four pixels q0, q1, q2, and q3 belonging to the first row, three pixels q0, q1, and q2 adjacent to the vertical boundary are target pixels on which deblocking filtering is performed.

In addition, in an example in which the deblocking filter is applied to the first column 331 of the Q block region 301 among the embodiments for the horizontal boundary shown in FIG. 3, three pixels q0, q1, and q2 adjacent to the horizontal boundary among four pixels q0, q1, q2, q3 belonging to the first column are target pixels on which deblocking filtering is performed.

However, in performing the deblocking filter on the corresponding pixels, the filtering may be performed by referring to the pixel value of another pixel value (e.g., q3) belonging to the first row or column other than the target pixel on which the deblocking filtering is performed. Alternatively, the filtering may be performed by referring to a pixel value of a neighboring row or column of the first row or column. Here, the neighboring row or column may belong to the current target block or may belong to a block spatially adjacent to the current target block (e.g., left/right, top/bottom). The location of the spatially adjacent block may be adaptively determined in consideration of the filtering direction (or boundary direction). Through the reference, whether to perform filtering, the strength of filtering, filter coefficients, the number of filter coefficients, a filtering direction, etc. may be adaptively determined. The above-described embodiment may be applied in the same/similar manner to the embodiments to be described later.

FIG. 3 illustrates an example in which the deblocking filter is applied to the Q block region, the first row 330 and the first column 331 are representatively shown, and subsequent rows belonging to the Q block region including the first row (second row, third row, etc.) and subsequent columns belonging to the Q block region including the first column (second column, third column, etc.) are also subjected to the deblocking filter.

In FIG. 3, the P block region means a block region spatially adjacent to a vertical boundary or a horizontal boundary of a current target block on which encoding and/or decoding is performed, and an example in which the deblocking filter is applied to the first row 330 of the P block region 310 is shown among embodiments for the vertical boundary shown in FIG. 3.

Among the four pixels p0, p1, p2, p3 belonging to the first row, three pixels (p0, p1, p2) adjacent to the vertical boundary are target pixels on which deblocking filtering is performed.

In addition, in an example in which the deblocking filter is applied to the first column 331 of the P block region 311 among embodiments for the horizontal boundary shown in FIG. 3, the three pixels p0, p1, and p2 adjacent to the horizontal boundary among four pixels p0, p1, p2, p3 belonging to the first column are also target pixels on which deblocking filtering is performed.

However, in performing the deblocking filter on the corresponding pixels, the filtering may be performed by referring to the pixel value of p3 other than the target pixels on which the deblocking filtering is performed.

FIG. 3 illustrates an example in which the deblocking filter is applied to the P block region, the first row 330 and the first column 331 are representatively shown, and subsequent rows belonging to the P block region including the first row (second row, third row, etc.) and subsequent columns belonging to the P block region including the first column (second column, third column, etc.) are also subjected to the deblocking filter.

Figure 4:
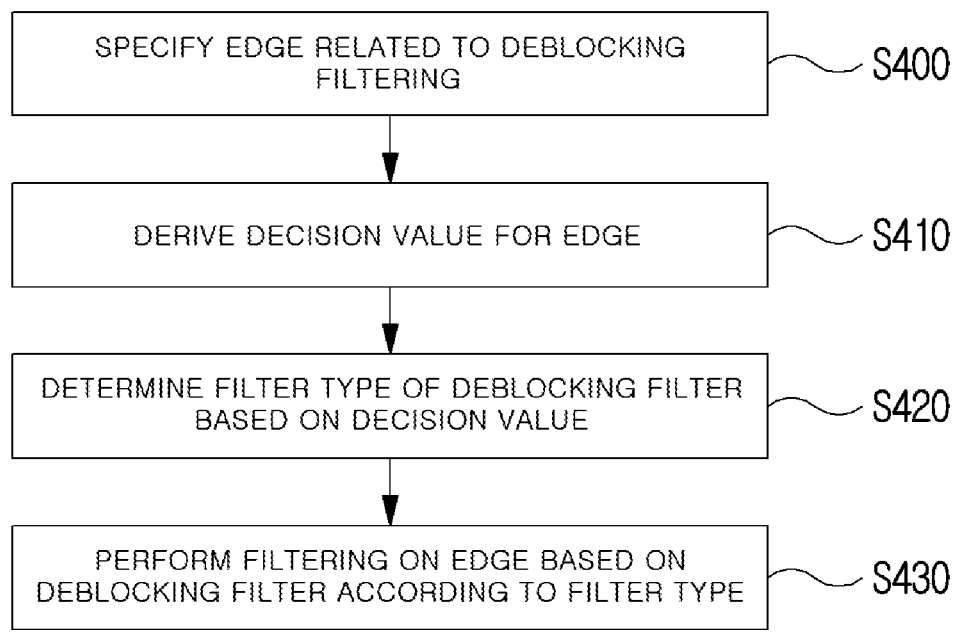
FIG. 4 illustrates a deblocking filtering process in the filter module 150 of the encoding apparatus and the filter module 240 of the decoding apparatus according to an embodiment to which the present disclosure is applied.

FIG. 4 illustrates a deblocking filtering process in the filter module 150 of the encoding apparatus and the filter module 240 of the decoding apparatus according to an embodiment to which the present disclosure is applied.

Referring to FIG. 4, a block boundary related to deblocking filtering (hereinafter, referred to as an edge) among block boundaries of a reconstructed picture may be specified (S400).

The reconstructed picture may be partitioned into a predetermined N×M pixel grid (sample grid). The N×M pixel grid may mean a unit in which deblocking filtering is performed. Here, N and M may be integers of 4, 8, 16 or more. The pixel grid may be defined for each component type. For example, when the component type is a luminance component, N and M may be set to 4, and when the component type is a chrominance component, N and M may be set to 8. Regardless of the component type, the N×M pixel grid with a fixed size may be used.

The edge is a block boundary located on the N×M pixel grid and may include at least one of a boundary of a transform block, a boundary of a prediction block, or a boundary of a sub-block. The sub-block may refer to a sub-block according to the aforementioned affine mode. A block boundary to which the deblocking filter is applied will be described with reference to FIGS. 5 and 6.

Referring to FIG. 4, a decision value for the specified edge may be derived (S410).

In this embodiment, it is assumed that the edge type is a vertical edge and a 4×4 pixel grid is applied. The left block and the right block from the edge will be referred to as a P block and a Q block, respectively. The P block and the Q block are pre-reconstructed blocks, the Q block may mean a region in which deblocking filtering is currently performed, and the P block may mean a block spatially adjacent to the Q block.

First, a decision value may be derived using a variable dSam for deriving the decision value. dSam may be derived for at least one of the first pixel line or the fourth pixel line of the P block and the Q block. Hereinafter, dSam for the first pixel line of the P block and Q block will be referred to as dSam0, and dSam for the fourth pixel line will be referred to as dSam3.

If at least one of the following conditions is satisfied, dSam0 may be set to 1, otherwise, dSam0 may be set to 0.

TABLE 1

| | Condition |
|---|---|
| 1 | dqp < first threshold value |
| 2 | (sp + sq) < second threshold value |
| 3 | spq < third threshold value |

In Table 1, dpq may be derived based on at least one of a first pixel value linearity d1 of the first pixel line of the P block or a second pixel value linearity d2 of the first pixel line of the Q block. Here, the first pixel value linearity d1 may be derived using i pixels p belonging to the first pixel line of the P block. i may be 3, 4, 5, 6, 7 or more. The i pixels p may be contiguous pixels adjacent to each other or non-contiguous pixels spaced apart from each other at regular intervals. In this case, the pixels p may be i pixels closest to the edge among the pixels of the first pixel line. Similarly, the second pixel value linearity d2 may be derived using j pixels q belonging to the first pixel line of the Q block. j may be 3, 4, 5, 6, 7 or more. j is set to the same value as i, but is not limited thereto, and may be a value different from i. The j pixels q may be contiguous pixels adjacent to each other or non-contiguous pixels spaced apart from each other at regular intervals. In this case, the pixels q may be j pixels closest to the edge among the pixels of the first pixel line.

For example, when three pixels p and three pixels q are used, the first pixel value linearity d1 and the second pixel value linearity d2 may be derived as in Equation 1 below.

$$d1 = \text{Abs}(p2, 0 - 2 * p1, 0 + p0, 0) \quad \text{[Equation 1]}$$

$$d2 = \text{Abs}(q2, 0 - 2 * q1, 0 + q0, 0)$$

Alternatively, when six pixels p and six pixels q are used, the first pixel value linearity d1 and the second pixel value linearity d2 may be derived as shown in Equation 2 below.

$$d1 = (\text{Abs}(p2, 0 - 2 * p1, 0 + p0, 0) + \quad \text{[Equation 2]}$$
$$\text{Abs}(p5, 0 - 2 * p4, 0 + p3, 0) + 1) >> 1$$
$$d2 = (\text{Abs}(q2, 0 - 2 * q1, 0 + q0, 0) +$$
$$\text{Abs}(q5, 0 - 2 * q4, 0 + q3, 0) + 1) >> 1$$

In Table 1, sp may denote a first pixel value gradient v1 of the first pixel line of the P block, and sq may denote a second pixel value gradient v2 of the first pixel line of the Q block. Here, the first pixel value gradient v1 may be derived using m pixels p belonging to the first pixel line of the P block. m may be 2, 3, 4, 5, 6, 7 or more. The m pixels p may be contiguous pixels adjacent to each other or non-contiguous pixels spaced apart from each other at regular intervals. Alternatively, some of them pixels p may be contiguous pixels adjacent to each other, and the remaining pixels may be non-contiguous pixels spaced apart from each other at regular intervals. Similarly, the second pixel value gradient v2 may be derived using n pixels q belonging to the first pixel line of the Q block. n may be 2, 3, 4, 5, 6, 7 or more. n is set to the same value as m, but is not limited thereto, and may be a different value from m. The n pixels q may be contiguous pixels adjacent to each other or non-contiguous pixels spaced apart from each other at regular intervals. Alternatively, some of the n pixels q may be contiguous pixels adjacent to each other, and the rest may be non-contiguous pixels spaced apart from each other at regular intervals.

For example, when two pixels p and two pixels q are used, the first pixel value gradient v1 and the second pixel value gradient v2 may be derived as shown in Equation 3 below.

$$v1 = \text{Abs}(p3, 0 - p0, 0) \quad \text{[Equation 3]}$$
$$v2 = \text{Abs}(q0, 0 - q3, 0)$$

Alternatively, when six pixels p and six pixels q are used, the first pixel value gradient v1 and the second pixel value gradient v2 may be derived as shown in Equation 4 below.

$$v1 = \quad \text{[Equation 4]}$$
$$\text{Abs}(p3, 0 - p0, 0) + \text{Abs}(p7, 0 - p6, 0 - p5, 0 + p4, 0)$$
$$v2 = \text{Abs}(q0, 0 - q3, 0) + \text{Abs}(q4, 0 - q5, 0 - q6, 0 + q7, 0)$$

The spq of Table 1 may be derived from the difference between the pixel p0,0 and the pixel q0,0 adjacent to the edge.

The first and second threshold values of Table 1 may be derived based on a predetermined parameter QP. Here, QP may be determined using at least one of a first quantization parameter of the P block, a second quantization parameter of the Q block, or an offset for deriving the QP. The offset may be a value encoded and signaled by the encoding apparatus. For example, the QP may be derived by adding the offset to an average value of the first and second quantization parameters. The third threshold value of Table 1 may be derived based on the aforementioned quantization parameter QP and a block boundary strength (BS). Here, the BS may be variably determined in consideration of a prediction mode of the P/Q block, an inter prediction mode, the presence or absence of a non-zero transform coefficient, a motion vector difference, and the like. For example, when the prediction mode of at least one of the P block and the Q block is the intra mode, the BS may be set to 2. When at least one of the P block or the Q block is coded in the combined prediction mode, BS may be set to 2. When at least one of the P block or the Q block includes a non-zero transform coefficient, BS may be set to 1. When the P block is coded in a different inter prediction mode from the Q block (e.g., the P block is coded in the current picture referencing mode and the Q block is coded in the merge mode or AMVP mode), BS may be set to 1. When both the P block and the Q block are coded in the current picture referencing mode, and a difference between their block vectors is greater than or equal to a predetermined threshold difference, BS may be set to 1. Here, the threshold difference may be a fixed value (e.g., 4, 8, 16) pre-promised to the encoding/decoding apparatus.

Since dSam3 is derived using one or more pixels belonging to the fourth pixel line through the same method as dSam0 described above, a detailed description thereof will be omitted.

A decision value may be derived based on the derived dSam0 and dSam3. For example, if both dSam0 and dSam3 are 1, the decision value may be set to a first value (e.g., 3), otherwise the decision value may set to a second value (e.g., 1 or 2).

Referring to FIG. 4, a filter type of the deblocking filter may be determined based on the derived decision value (S420).

In the encoding/decoding apparatus, a plurality of filter types having different filter lengths may be defined. As examples of the filter type, there are a long filter with the longest filter length, a short filter with the shortest filter length, or one or more middle filters longer than the short filter and shorter than the long filter. The number of filter types defined in the encoding/decoding apparatus may be two, three, four, or more.

For example, when the decision value is a first value, a long filter may be used, and when the decision value is a second value, a short filter may be used. Alternatively, when the decision value is the first value, one of a long filter or a middle filter may be selectively used, and when the decision value is the second value, a short filter may be used. Alternatively, when the decision value is the first value, a long filter may be used, and when the decision value is not the first value, one of a short filter or a middle filter may be selectively used. In particular, when the decision value is 2, a middle filter may be used, and when the decision value is 1, a short filter may be used.

Referring to FIG. 4, filtering may be performed on the edge of the reconstructed picture based on the deblocking filter according to the determined filter type (S430).

The deblocking filter may be applied to a plurality of pixels positioned in both directions based on the edge and positioned on the same pixel line. Here, a plurality of pixels to which the deblocking filter is applied is referred to as a filtering region, and the length (or number of pixels) of the filtering region may be different for each filter type. The length of the filtering region may be interpreted as being equivalent to the filter length of the aforementioned filter type. Alternatively, the length of the filtering region may mean the sum of the number of pixels to which the deblocking filter is applied in the P block and the number of pixels to which the deblocking filter is applied in the Q block.

In this embodiment, it is assumed that three filter types, i.e., a long filter, a middle filter, and a short filter, are defined in the encoding/decoding apparatus, and a deblocking filtering method for each filter type will be described. However, the present disclosure is not limited thereto, and only a long filter and a middle filter may be defined, only a long filter and a short filter may be defined, or only a middle filter and a short filter may be defined.

1. In Case of Long Filter-Based Deblocking Filtering

For convenience of explanation, it is assumed below that, unless otherwise stated, an edge type is a vertical edge, and a pixel to be currently filtered (hereinafter, a current pixel q) belongs to a Q block. The filtered pixel fq may be derived through a weighted average of a first reference value and a second reference value.

Here, the first reference value may be derived using all or some of the pixels of the filtering region to which the current pixel q belongs. Here, the length (or the number of pixels) of the filtering region may be an integer of 8, 10, 12, 14 or more. Some pixels of the filtering region may belong to the P block, and the remaining pixels may belong to the Q block. For example, when the length of the filtering region is 10, five pixels may belong to the P block and five pixels may belong to the Q block. Alternatively, three pixels may belong to the P block and seven pixels may belong to the Q block. Conversely, seven pixels may belong to the P block and three pixels may belong to the Q block. In other words, the long filter-based deblocking filtering may be performed symmetrically on the P block and the Q block, or may be performed asymmetrically.

Regardless of the position of the current pixel q, all pixels belonging to the same filtering region may share one same first reference value. That is, the same first reference value may be used regardless of whether the pixel to be currently filtered is located in the P block or the Q block. The same first reference value may be used regardless of the position of the pixel to be currently filtered in the P block or the Q block.

A second reference value may be derived using at least one of a pixel farthest from an edge (hereinafter, a first pixel) among pixels of the filtering region belonging to the Q block or a neighboring pixel of the filtering region. The neighboring pixel may mean at least one pixel adjacent to the right side of the filtering region. For example, the second reference value may be derived as an average value between one first pixel and one neighboring pixel. Alternatively, the second reference value may be derived as an average value between two or more first pixels and two or more neighboring pixels adjacent to the right side of the filtering region.

For the weighted average, predetermined weights f1 and f2 may be applied to the first reference value and the second reference value, respectively. Specifically, the encoding/decoding apparatus may define a plurality of weight sets and set the weight f1 by selectively using any one of the plurality of weight sets. The selection may be performed in consideration of the length (or the number of pixels) of the filtering region belonging to the Q block. For example, the encoding/ decoding apparatus may define weight sets as shown in Table 2 below. Each weight set may consist of one or more weights corresponding to positions of pixels to be filtered, respectively. Accordingly, from among a plurality of weights belonging to the selected weight set, a weight corresponding to the position of the current pixel q may be selected and applied to the current pixel q. The number of weights constituting the weight set may be equal to the length of the filtering region included in the Q block. A plurality of weights constituting one weight set may be sampled at regular intervals within a range of an integer greater than 0 and less than 64. Here, 64 is only an example, and may be greater or less than 64. The predetermined interval may be 9, 13, 17, 21, 25 or more. The interval may be variably determined according to the length (L) of the filtering region belonging to the Q block. Alternatively, a fixed interval may be used regardless of L.

TABLE 2

| Length of filtering region belonging to Q block (L) | Weight set |
| --- | --- |
| L > 5 | {59, 50, 41, 32, 23, 14, 5} |
| 5 | {58, 45, 32, 19, 6} |
| L < 5 | {53, 32, 11} |

Referring to Table 2, when the length (L) of the filtering region belonging to the Q block is greater than 5, {59, 50, 41, 32, 23, 14, 5} is selected among the three weight sets. When L is 5, {58, 45, 32, 19, 6} may be selected. When L is less than 5, {53, 32, 11} may be selected. However, Table 2 is only an example of the weight set, and the number of weight sets defined in the encoding/decoding apparatus may be 2, 4, or more.

Also, when L is 7 and the current pixel is the first pixel q0 from the edge, a weight of 59 may be applied to the current pixel. When the current pixel is the second pixel q1 from on the edge, a weight of 50 may be applied to the current pixel, and when the current pixel is the seventh pixel q6 from on the edge, a weight of 5 may be applied to the current pixel.

The weight f2 may be determined based on the predetermined weight f1. For example, the weight f2 may be determined as a value obtained by subtracting the weight f1 from a pre-defined constant. Here, the pre-defined constant is a fixed value pre-defined in the encoding/decoding apparatus, and may be 64. However, this is only an example, and an integer greater than or less than 64 may be used.

2. In Case of Middle Filter-Based Deblocking Filtering

The filter length of the middle filter may be smaller than the filter length of the long filter. The length (or the number of pixels) of the filtering region according to the middle filter may be smaller than the length of the filtering region according to the above-described long filter.

For example, the length of the filtering region according to the middle filter may be 6, 8 or more. Here, the length of the filtering region belonging to the P block may be the same as the length of the filtering region belonging to the Q block. However, the present disclosure is not limited thereto, and the length of the filtering region belonging to the P block may be longer or shorter than the length of the filtering region belonging to the Q block.

Specifically, the filtered pixel fq may be derived using the current pixel q and at least one neighboring pixel adjacent to the current pixel q. Here, the neighboring pixel may include at least one of one or more pixels adjacent to the left of the current pixel q (hereinafter, left neighboring pixel) or one or more pixels adjacent to the right of the current pixel q (hereinafter, right neighboring pixel).

For example, when the current pixel q is q0, two left neighboring pixels p0 and p1 and two right neighboring pixels q1 and q2 may be used. When the current pixel q is q1, two left neighboring pixels p0 and q0 and one right neighboring pixel q2 may be used. When the current pixel q is q2, three left neighboring pixels p0, q0, q1 and one right neighboring pixel q3 may be used.

3. In Case of Short Filter-Based Deblocking Filtering

The filter length of the short filter may be smaller than the filter length of the middle filter. The length (or the number of pixels) of the filtering region according to the short filter may be smaller than the length of the filtering region according to the above-described middle filter. For example, the length of the filtering region according to the short filter may be 2, 4, or more.

Specifically, the filtered pixel fq may be derived by adding or subtracting a predetermined first offset (offset1) to the current pixel q. Here, the first offset may be determined based on a difference value between the pixel of the P block and the pixel of the Q block. For example, as shown in Equation 5 below, the first offset may be determined based on the difference value between the pixel p0 and the pixel q0 and the difference value between the pixel p1 and the pixel q1. However, the filtering of the current pixel q may be performed only when the first offset is less than a predetermined threshold value. Here, the threshold value is derived based on the aforementioned quantization parameter QP and block boundary strength (BS), and a detailed description thereof will be omitted.

$$\text{offset1} = (9*(q0-p0)-3*(q1-p1)+8) >> 4 \qquad \text{[Equation 5]}$$

Alternatively, the filtered pixel fq may be derived by adding a predetermined second offset (offset2) to the current pixel q. Here, the second offset may be determined in consideration of at least one of a difference (or variation) between the current pixel q and a neighboring pixel or the first offset. Here, the neighboring pixel may include at least one of a left pixel or a right pixel of the current pixel q. For example, the second offset may be determined as in Equation 6 below.

$$\text{offset2} = (((q2+q0+1) >> 1) - q1 - \text{offset1}) >> 1 \qquad \text{[Equation 6]}$$

A method of performing deblocking filtering on the block boundary of a reconstructed picture will be described in detail with reference to FIGS. 7 and 8. The above-described filtering method is not limited to being applied only to the deblocking filter, and it may be same/similarly applied to adaptive sample offset (SAO), adaptive loop filter (ALF), etc. which are examples of the in-loop filter.

Figure 5:
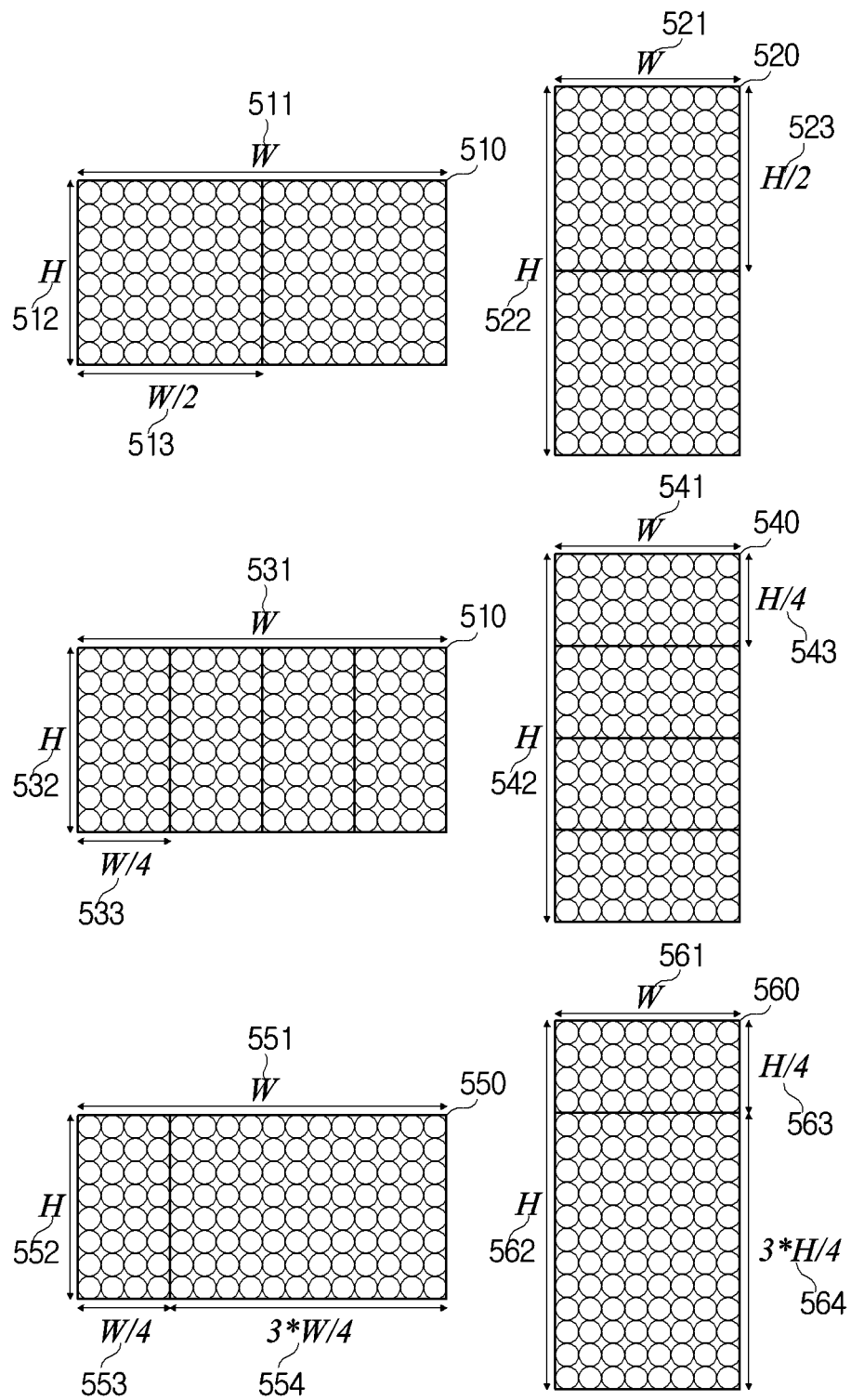
FIG. 5 is a diagram illustrating a concept of performing prediction and transform by dividing one coding block into a plurality of sub-blocks.

FIG. 5 is a diagram illustrating a concept of performing prediction and transform by dividing one coding block into a plurality of sub-blocks.

As shown in FIG. 5, prediction or transform may be performed by dividing one coding block into two or four in one of a horizontal direction or a vertical direction. The coding block may also be understood as a decoding block. In this case, only prediction may be performed by dividing the coding block into two or four in one of the horizontal direction or the vertical direction, or both prediction and transform may be performed by dividing into two or four, or only transform may be performed by dividing into two or four.

In this case, by dividing the single coding block into two or four in the horizontal or vertical direction, intra prediction and transform may be performed in each division unit.

FIG. 5 does not limit the number of divisions, and it may be divided into 3, 5, or more. Here, the number of divisions may be variably determined based on block attributes. Block attributes may mean an encoding parameter such as block size/shape, component type (luminance, chrominance), prediction mode (intra prediction or inter mode), inter prediction mode (inter prediction mode pre-defined in the decoder such as merge mode, AMVP mode, affine mode, etc.), a prediction/transform unit, and a position or length of a block boundary, and the like.

Alternatively, one of non-division or two-division may be selectively used, and one of non-division or four-division may be selectively used. Alternatively, any one of non-division, two-division, and four-division may be selectively used.

According to the embodiment shown in FIG. 5, when one coding block 510 is vertically divided into two sub-blocks, the width (W) (511) of the block may be equally divided into two so that the width of the divided sub-block is W/2 (513). When one coding block 520 is horizontally divided into two sub-blocks, the height of the block (H) (522) may be equally divided into two so that the height of the divided sub-block is H/2 (523).

In addition, according to another embodiment shown in FIG. 5, when one coding block 530 is vertically divided into four sub-blocks, the width (W) (531) of the block may be equally divided into four so that the divided sub-block has a width of W/4 (533). When one coding block 540 is horizontally divided into four sub-blocks, the height (H) (542) of the block may be equally divided into four so that the divided sub-block has a width of H/4 (543).

In addition, according to an embodiment of the present disclosure, in the case of a sub-block intra prediction mode among modes of performing prediction by dividing the current coding block into a plurality of sub-blocks, transform may be performed on the current coding block in the same shape as the sub-block on which prediction is performed. In this case, the transform unit may be divided to have the same size/shape as the sub-block, or a plurality of transform units may be merged. Or, conversely, a sub-block unit may be determined based on a transform unit, and intra prediction may be performed in a sub-block unit. The above-described embodiment may be applied in the same/similar manner to the embodiments to be described later.

In addition, according to another embodiment shown in FIG. 5, when one coding block 530 is vertically divided into four sub-blocks, the width (W) 531 of the block is equally divided into four so that the divided sub-block has a width of W/4 (433). When one coding block 440 is horizontally divided into four sub-blocks, the height (H) 542 of the block is equally divided into four so that the divided sub-block has a height of H/4 (543).

In addition, according to an embodiment of the present disclosure, in the case of a sub-block intra prediction mode among modes of performing prediction by dividing the current coding block into a plurality of sub-blocks, transform may be performed on the current coding block in the same shape as the sub-block on which prediction is performed.

When one coding block is divided into two or four sub-blocks to perform intra prediction and transform according to the sub-block, blocking artifacts may occur at the boundary of the sub-block. Accordingly, in the case of performing intra prediction in units of sub-blocks, a deblocking filter may be performed at the boundary of each sub-block. The deblocking filter may be selectively performed, and flag information may be used for this purpose. The flag information may indicate whether filtering is performed on a boundary of a sub-block. The flag information may be encoded by the encoding apparatus and signaled to the decoding apparatus, or may be derived from the decoding apparatus based on a block attribute of at least one of a current block and a neighboring block. The block attribute is the same as described above, and a detailed description thereof will be omitted.

When the deblocking filter is performed on one coding block, if the current coding block is a block on which prediction and transform are performed through intra prediction in units of sub-blocks, the deblocking filter may be performed in units of sub-blocks inside the current block.

In performing the deblocking filter on one coding block, when the current coding block is a block on which prediction and transform are performed through intra-prediction in units of sub-blocks, but the boundary of the sub-block is not located on the block grid (N×M sample grid) for performing the deblocking filter, the deblocking filtering is skipped at the boundary of the corresponding sub-block. Only when the boundary of the corresponding sub-block is located on the block grid for performing the deblocking filter, the deblocking filtering may be performed at the boundary of the sub-block.

In this case, the block grid for performing the deblocking filter means a minimum block boundary unit to which deblocking filtering can be applied, and may mean a minimum pixel interval between a previous block boundary and a next block boundary. In general, 8×8 may be used as the block grid. However, this is not limited to an 8×8 block, and 4×4 or 16×16 may also be used. Block grids of different sizes may be used depending on the component type. For example, a block grid having a size smaller than that of the chrominance component may be used for the luminance component. A block grid of a fixed size for each component type may be used.

As shown in FIG. 5, when one coding block is divided into two in one of the horizontal direction or the vertical direction, it may be divided into asymmetric sub-blocks.

In this case, an embodiment of a case in which one coding block is asymmetrically divided into two in one of the horizontal direction or the vertical direction is illustrated in FIG. 5.

The current coding block 550 is vertically partitioned into two sub-blocks so that the first sub-block is composed of a sub-block having a height of H and a width of W/4, and the second sub-block is composed of a sub-block having a height of H and a width of 3*W/4.

In addition, the current coding block 560 is horizontally divided into two sub-blocks, so that the first sub-block is composed of a sub-block having a height of H/4 and a width of W, and the second sub-block is composed of a sub-block having a height of H/4 and a width of W.

Independent transform and/or inverse-transform may be performed in units of the sub-blocks, and transform and/or inverse-transform may be performed only in some sub-blocks of the current coding block. Here, some sub-blocks may mean N sub-blocks located on the left or top side of the current target block. N may be 1, 2, 3, etc. N may be a fixed value pre-promised to the decoding apparatus, or may be variably determined in consideration of the aforementioned block attribute.

The transform process for some sub-blocks may be limited to be performed only when the shape of the current target block is a rectangle (W>H, W<H). Alternatively, it may be limited to be performed only when the size of the current target block is greater than or equal to the threshold size.

Even in the case of a coding block in which transform and inverse-transform are performed only on some sub-blocks of the current coding block, the above-described sub-block unit deblocking filter process may be equally applied.

Figure 6:
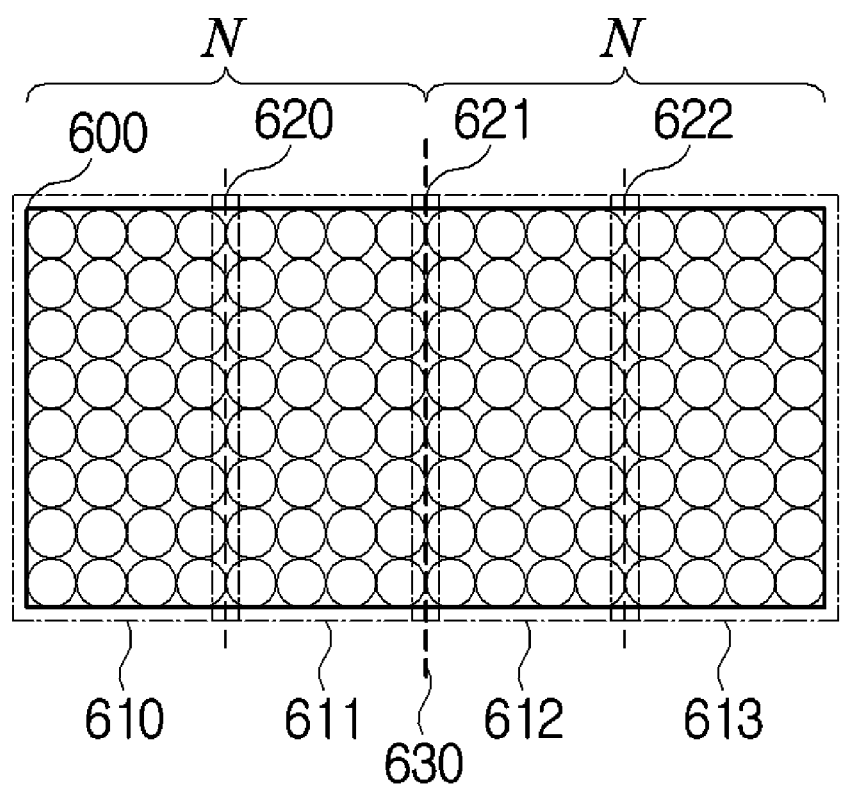
FIG. 6 is a diagram illustrating an example of sub-block division for one coding block, and the concept of a sub-block boundary and a deblocking filter grid.

FIG. 6 is a diagram illustrating an example of sub-block division for one coding block, and the concept of a sub-block boundary and a deblocking filter grid.

FIG. 6 illustrates a case in which one 16×8 coding block 600 is vertically partitioned into four 4×8 sub-blocks 610-613. In this case, a total of three sub-block boundaries may occur. A first sub-block boundary 620 occurring between the first sub-block 610 and the second sub-block 611, a second sub-block boundary 621 occurring between the second sub-block 611 and the third sub-block 612, and a third sub-block boundary 622 occurring between the third sub-block 612 and the fourth sub-block 613 are examples.

In this case, only the second sub-block boundary 621 exists on the deblocking filter grid as the sub-block boundary existing on the deblocking filter grid to which the deblocking filter performance is applied among the sub-block boundaries.

Therefore, when the current coding block is a block where prediction and transform is performed through intra prediction of a sub-block division unit, in performing deblocking filtering, the deblocking filter may be performed only at the block boundary existing on the deblocking filter grid. Alternatively, different deblocking filters may be applied to the second sub-block boundary and the first sub-block boundary. That is, at least one of filter coefficients, number of taps, and strength of the deblocking filter may be different.

The block grid for performing the deblocking filter may be configured in units of N pixels, where N is a pre-defined specific integer, and one or more of 4, 8, 16, 32, etc. may be adaptively used.

For the detailed description of the present disclosure, the embodiment shown in FIG. 6 is used.

FIG. 6 illustrates an embodiment in which one 16×8 coding block is vertically partitioned into four sub-blocks, and prediction and transformation are performed through intra prediction in sub-block units.

In this case, the single 16×8 coding block is divided into four 4×8 sub-blocks, and is reconstructed by performing intra prediction and transform in sub-block units, and is input to the deblocking filter step.

One coding block input to the deblocking filter step includes a first vertical boundary 621 between the first sub-block 610 and the second sub-block 611, a second vertical boundary 620 between the second sub-block 611 and the third sub-block 612, and a third vertical boundary 622 between the third sub-block 612 and the fourth sub-block 613.

In this case, when the block grid for the current deblocking filter is 8×8, the sub-block boundary existing on the deblocking filter grid among the sub-block boundaries is only the second vertical boundary 620.

According to an embodiment of the present disclosure, when the current coding block is a block on which prediction and/or transform is performed through intra prediction in sub-block units, the deblocking filter may be performed on both a sub-block boundary existing on the deblocking filter grid such as the second vertical boundary 620 and a sub-block boundary not existing on the deblocking filter grid such as the first vertical boundary 621 and the third vertical boundary 622. In this case, properties (e.g., at least one of strength, number of taps, coefficients, position/number of input pixels, etc.) of the deblocking filter applied to each boundary may be different.

According to another embodiment of the present disclosure, when the current coding block is a block on which prediction and/or transform is performed through intra prediction in sub-block units, the deblocking filter may be performed only on the sub-block boundary existing on the deblocking filter grid such as the second vertical boundary 620, and the deblocking filter may not be performed on the sub-block boundary not existing on the deblocking filter grid such as the first vertical boundary 621 and the third vertical boundary 622.

In addition, in case of the deblocking filter proposed by the present disclosure, when the deblocking filter is performed on one coding block and the current coding block is a block on which prediction and/or transform is performed through intra prediction in sub-block units, the deblocking filtering may be performed on a pixel different from a coding block having the same size as the current coding block, a different deblocking filter strength may be used, or a different number of deblocking filter taps may be applied.

In an embodiment of the present disclosure, when the current coding block is smaller than a specific block size M, the deblocking filter may be performed on N pixels located in a Q block (a block to which the deblocking filter is currently applied) located at least one boundary of a coding block (CB: Coding block), a prediction block (PB: Prediction block), or a transform block (TB) existing on the block grid for the deblocking filter.

In this case, when the current coding block is a block on which prediction and/or transform is performed through intra prediction in the sub-block unit, the deblocking filter may be performed on (N+K) pixels located in the Q block.

In this case, M may mean the width or height of the block, and may be 16, 32, 64, or 128.

Also, in this case, N denotes the number of pixels adjacent to the block boundary included in the P block (a block adjacent to a block to which the deblocking filter is currently applied and a block boundary) and the Q block (a block to which the deblocking filter is currently applied) and it may be an integer of 1, 2, 3, 4, 5, 6, 7 or more.

In addition, when the current coding block is a block on which prediction and/or transform is performed through intra prediction in sub-block units, K denotes the number of pixels to be additionally subjected to the deblocking filter among pixels adjacent to the block boundary included in the Q block and it may have one of from 0 to an integer minus N from the width and height of the current block.

In another embodiment of the present disclosure, when the current coding block is a block on which prediction and/or transform is performed through intra prediction in sub-block units, a deblocking filter strength different from the filter applied to the N pixels may be used for the K pixels located in the Q block.

In addition, when the current coding block is a block on which prediction and transform are performed through intra prediction in the sub-block unit, a deblocking filter different from the filter applied to the N pixels may be applied to the K pixels located in the Q block. The above-described different filter may mean that at least one or more of a filter strength, a coefficient value, the number of taps, and the number/position of input pixels are different.

Figure 7:
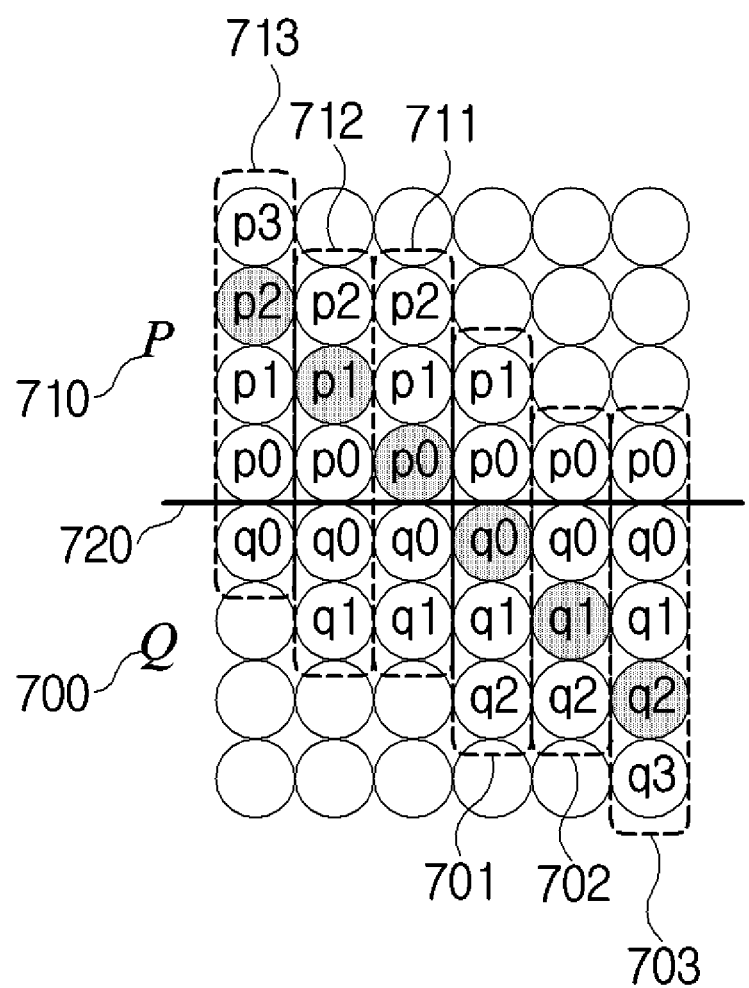
FIG. 7 is a diagram illustrating the concept of a pixel to be currently filtered and a reference pixel used for filtering at a boundary between a P block and a Q block.

FIG. 7 is a diagram illustrating the concept of a pixel to be currently filtered and a reference pixel used for filtering at a boundary between a P block and a Q block.

FIG. 7 is a diagram illustrating an example of a pixel to be subjected to deblocking filtering and a reference pixel used for filtering at the boundary between the P block and the Q block when the deblocking filter is applied to the horizontal boundary.

FIG. 7 illustrates a Q block 700 that is a block currently subjected to deblocking filtering, a P block 710 that is a block spatially adjacent to the top, and a boundary 720 between the P block and the Q block. Target pixels to which deblocking filtering is applied in the P block are a total of three pixel rows adjacent to the block boundary 720, and the concept of reference pixels for performing filtering in each pixel row is illustrated in 713, 712, and 711 of FIG. 7. However, FIG. 7 shows an embodiment for a horizontal boundary. In the present disclosure, when the deblocking filter is applied to a vertical boundary, all concepts of the present disclosure described above or later are applied to pixel columns instead of pixel rows.

In 713 of FIG. 7, a target pixel for deblocking filtering is a pixel p2, which is the third pixel from the boundary, and pixels referred to for performing deblocking filtering on the pixel p2 are p3, p2, p1, p0, and q0 pixels. In this case, the pixel p2 may be set to a value p2' that is a weighted average value using a pre-defined weight and five pixels p3, p2, p1, p0, and q0. However, in this case, the weighted averaged value p2' is used as one value within a range of the value added or subtracted from the value of p2 by a specific offset value.

In 712 of FIG. 7, a target pixel for deblocking filtering is a pixel p1, which is the second pixel from the boundary, and pixels referred to for performing deblocking filtering on the pixel p1 are pixels p2, p1, p0, and q0. In this case, the pixel p1 may be set to a value p1' that is a weighted average value using a pre-defined weight and four pixels p2, p1, p0, and q0. However, in this case, the weighted averaged value p1' is used as one value within the range of the value added or subtracted from the value of p1 by a specific offset value.

In 711 of FIG. 7, a target pixel for deblocking filtering is a pixel p0, which is the first pixel from the boundary, and pixels referred to for performing deblocking filtering on the pixel p0 are p2, p1, p0, q0, and q1 pixels. In this case, the pixel p0 may be set to a value p0' that is a weighted average value using a pre-defined weight and five pixels p2, p1, p0, q0, and q1. However, in this case, the weighted averaged value p0' is used as one value within the range of the value added or subtracted from the value of p0 by a specific offset value.

Similarly, target pixels to which deblocking filtering is applied in the Q block are a total of three pixel rows adjacent to the block boundary 720, and the concept of reference pixels for performing filtering in each pixel row is shown in 703, 702, and 701 of FIG. 7. However, FIG. 7 shows an embodiment for a horizontal boundary. In the present disclosure, when the deblocking filter is applied to a vertical boundary, all concepts of the present disclosure described above or later are applied to pixel columns instead of pixel rows.

In 703 of FIG. 7, a target pixel for deblocking filtering is a pixel q2, which is the third pixel from the boundary, and pixels referred to for performing deblocking filtering on the pixel q2 are q3, q2, q1, q0, and p0 pixels. In this case, the pixel q2 may be set to a value p2' that is a weighted average value using a pre-defined weight and five pixels q3, q2, q1, q0, and p0. However, in this case, the weighted averaged value q2' is used as one value within the range of the value added or subtracted from the value of q2 by a specific offset value.

In 702 of FIG. 7, a target pixel for deblocking filtering is a pixel q1, which is the second pixel from the boundary, and pixels referred to for performing deblocking filtering on the pixel q1 are q2, q1, q0, and p0 pixels. In this case, the pixel q1 may be set to a value q1' that is a weighted average value using a pre-defined weight and four pixels q2, q1, q0, and p0. However, in this case, the weighted averaged value q1' is used as one value within the range of the value added or subtracted from the value of q1 by a specific offset value.

In 701 of FIG. 7, a target pixel for deblocking filtering is a pixel q0, which is the first pixel from the boundary, and pixels referred to for performing deblocking filtering on the pixel q0 are q2, q1, q0, p0, and p1 pixels. In this case, the pixel p0 may be set to a value q0' that is a weighted average value using a pre-defined weight and five pixels q2, q1, q0, p0, and p1. However, in this case, the weighted averaged value q0' is used as one value within the range of the value added or subtracted from the value of q0 by a specific offset value.

Figure 8:
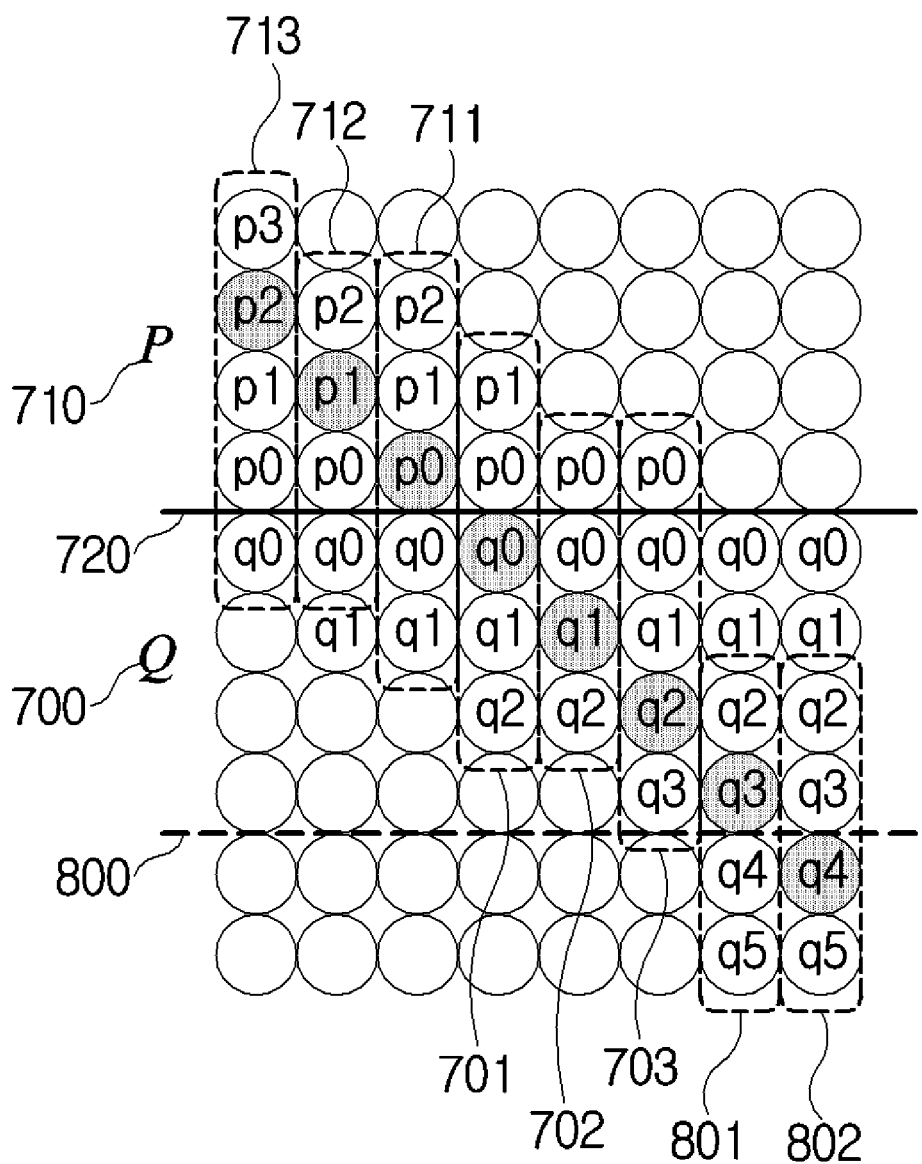
FIG. 8 is a diagram illustrating the concept of a pixel to be subjected to blocking filtering and a reference pixel used for filtering at a boundary between a P block and a Q block and a sub-block boundary within the Q block.

FIG. 8 is a diagram illustrating the concept of a pixel to be subjected to blocking filtering and a reference pixel used for filtering at a boundary between a P block and a Q block and a sub-block boundary within the Q block.

Unlike the method of performing deblocking filtering only at the boundary between the P block and the Q block shown in FIG. 7, even if it is not located on the block grid of the deblocking filter, when the Q block is a block that performs sub-block-based intra prediction or sub-block-based transform, blocking artifacts may occur at the sub-block boundary. In order to effectively remove this, an embodiment in which a deblocking filter is additionally applied even to pixels located at the sub-block boundary inside the Q block is illustrated in FIG. 8.

In addition to FIG. 7, in FIG. 8, the target pixels for deblocking filtering are a total of three pixel rows adjacent to the block boundary 720 and an additional N pixel rows of the sub-block boundary 800 existing inside the block. The concept of performing filtering on the additional N pixel rows of the sub-block boundary and the concept of a reference pixel are illustrated in 801 and 802 of FIG. 8. However, FIG. 8 shows an embodiment of a horizontal boundary. In the present disclosure, when the deblocking filter is applied to a vertical boundary, all concepts of the present disclosure described above or below are applied to pixel columns instead of pixel rows.

In addition, FIG. 8 illustrates a case where N is 2 as an embodiment for the additional N pixel rows of the sub-block boundary 800, but the present disclosure is not limited thereto, and N may be 4 or 8 as an embodiment of the present disclosure.

In 801 of FIG. 8, a target pixel for deblocking filtering is a pixel q3, which is the top or left first pixel from the sub-block boundary 500, and pixels referred to for performing deblocking filtering on the pixel q3 are q2, q3, q4, and q5 pixels. In this case, the pixel q3 may be set to a value q3' that is a weighted average value using a pre-defined weight and four pixels q2, q3, q4, and q5. However, in this case, the weighted averaged value q3' is used as one value within the range of the value added or subtracted from the q3 value by a specific offset value. In addition, the q2, q4, and q5 pixels are not limited to the content illustrated in FIG. 8, and it may mean a pixel at a pre-defined position, such as +1, +2, −1, −2 or +N, −N, located at an integer pixel distance from the sub-block boundary.

In 802 of FIG. 8, a target pixel for deblocking filtering is a pixel q4, which is the bottom or right first pixel from the sub-block boundary 800, and pixels referred to for performing deblocking filtering on the pixel q4 are q2, q3, q4, and q5 pixels. In this case, the pixel q4 may be set to a q4' value that is a weighted average value using a pre-defined weight and four pixels q2, q3, q4, and q5. However, in this case, the weighted averaged value q4' is used as one value within the range of the value added or subtracted from the q4 value by a specific offset value. In addition, the q2, q3, and q5 pixels are not limited to the content illustrated in FIG. 8, and it may mean a pixel at a pre-defined position, such as +1, +2, −1, −2 or +N, −N, located at an integer pixel distance from the sub-block boundary.

In the above embodiment, filtering using 4 pixels is taken as an example of the deblocking filter for the sub-block boundary, but in the present disclosure, 5 pixels or 3 pixels may be referred to for the target pixel of the deblocking filter. Also, the number of reference pixels for deblocking filtering may be different from each other according to positions.

Figure 9:
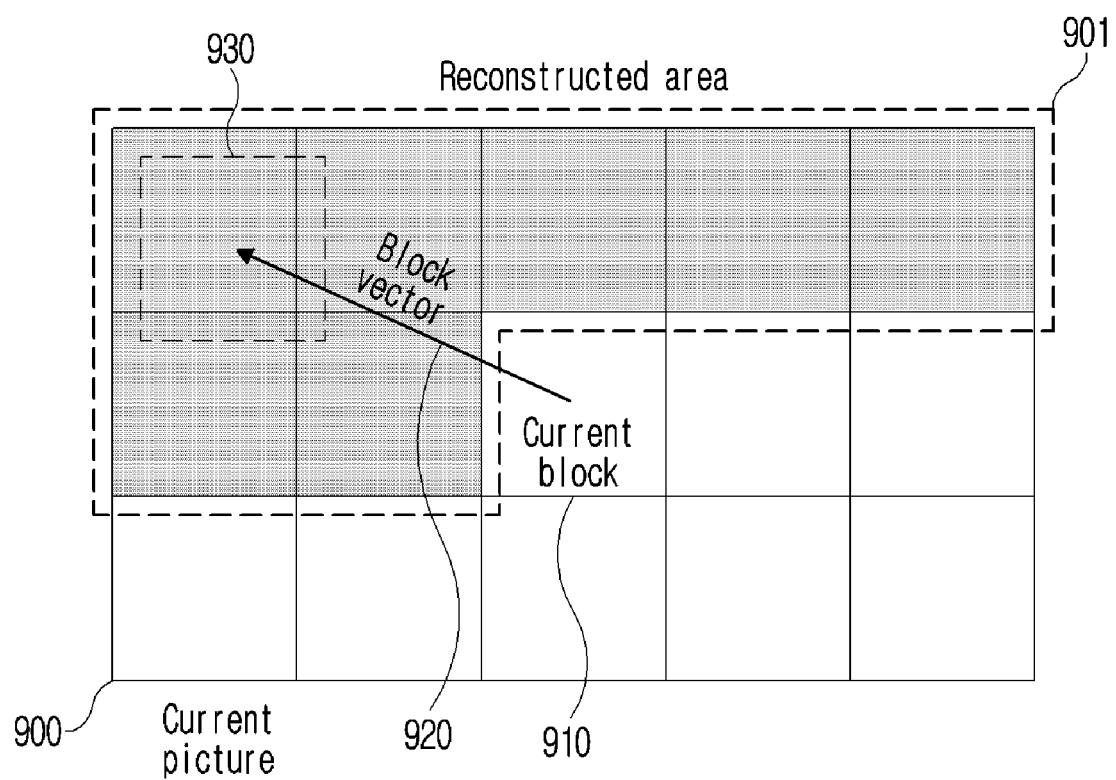
FIG. 9 is a diagram for explaining a basic concept of a current picture referencing mode.

FIG. 9 is a diagram for explaining a basic concept of a current picture referencing mode.

As shown in FIG. 9, the current picture referencing technique is a technique for performing prediction in an already reconstructed region of the same picture as the current block in performing prediction on the current block.

When encoding or decoding the current block 910 of the current picture 900 of FIG. 9, a pre-reconstructed region 901 may exist according to the encoding and decoding order and a region having pixel similarity to the current block 110 may exist. Therefore, the current picture referencing technology is defined a technology in which, based on the pixel similarity, a reference block 930 similar to the current block 910 exists in the region 901 of the pre-reconstructed current picture, and prediction is performed using the reference block 930.

Information on whether the current picture is referenced may be encoded and signaled by the encoding apparatus, or may be derived from the decoding apparatus. In this case, the derivation is performed based on the size, shape, location, division type (e.g., quad tree, binary tree, ternary tree), prediction mode of the block, location/type of the tile or tile group to which the block belongs, etc. Here, the block may mean at least one of a current block or a neighboring block adjacent to the current block.

In this case, the pixel distance between the current block 910 and the reference block 930 is defined as a vector, and the vector is referred to as a block vector.

In encoding the current picture referencing mode, information on the block vector may be derived using methods such as skip, merge, and differential signal transmission through a block vector prediction method, similar to inter prediction. For example, the block vector may be derived from a neighboring block of the current block. In this case, the neighboring block may be limited to a block coded in the current picture referencing mode or may be limited to a block coded in the merge mode (or skip mode). It may be limited to a block coded in other prediction modes (AMVP mode, affine mode, etc.) pre-defined in the decoding apparatus. Alternatively, the block vector may be derived based on information specifying the position of the reference block (e.g., block index).

Figure 10:
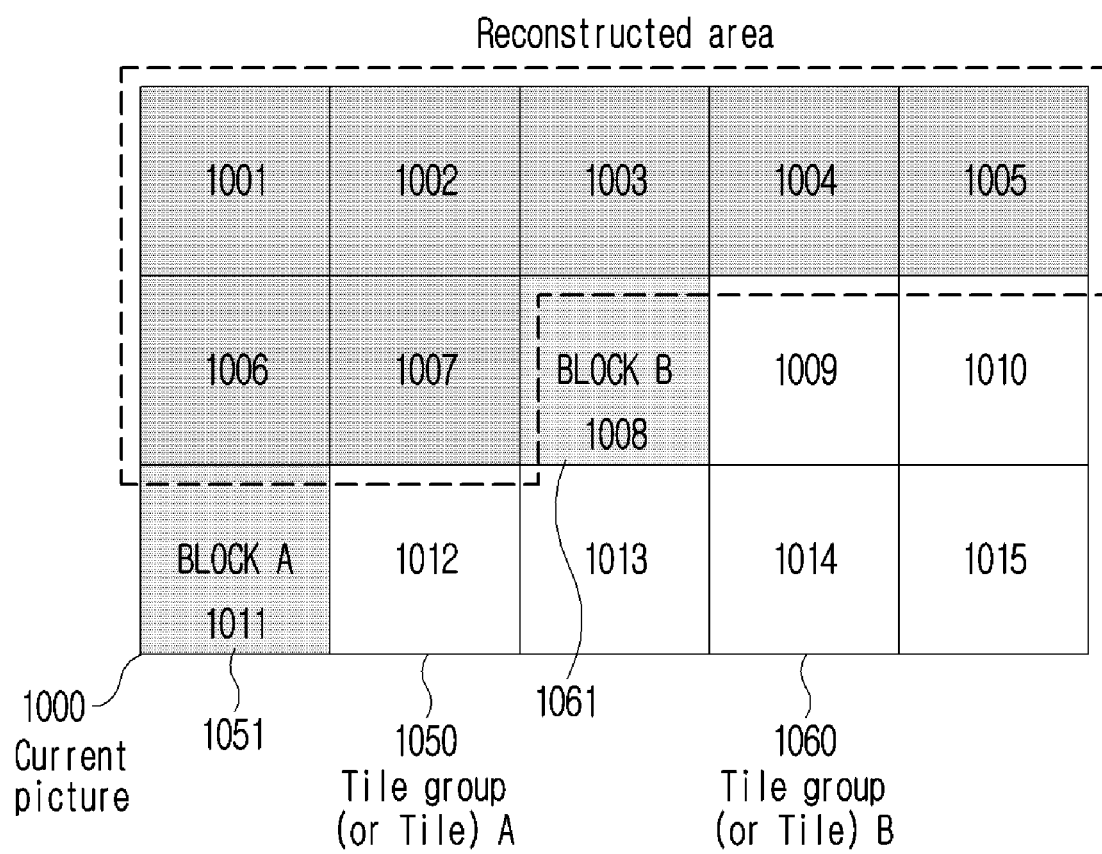
FIG. 10 is a diagram illustrating an embodiment of a current picture referencing region according to a position of a current block.
Figure 11A:
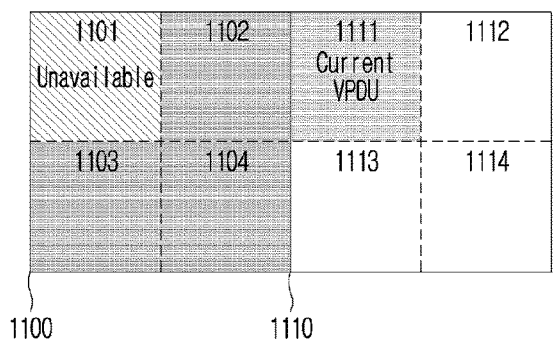
FIGS. 11 to 14 illustrate embodiments of a region including a current block and a searchable and referenceable region of a current picture referencing (CPR).
Figure 11B:
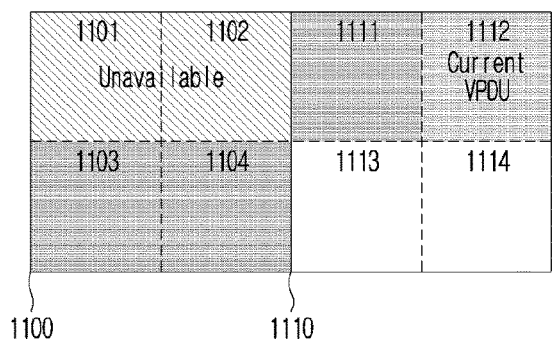
Figure 11C:
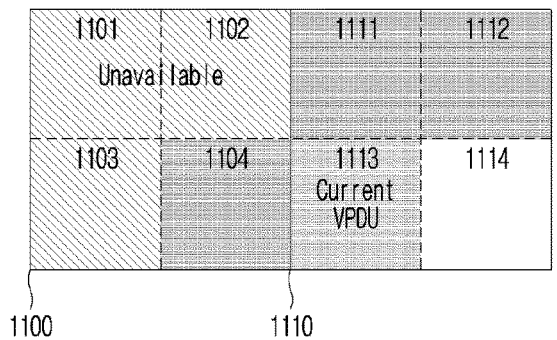
Figure 11D:
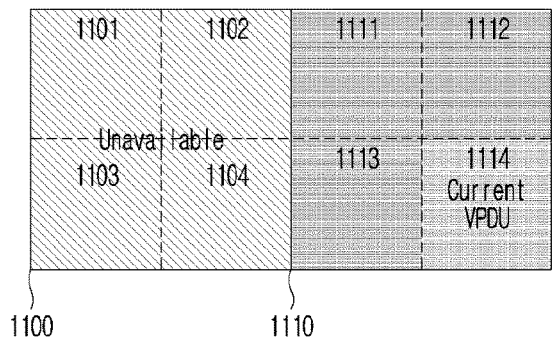

FIG. 10 is a diagram illustrating an embodiment of a current picture referencing region according to a position of a current block.

FIG. 10 shows in detail an embodiment in which the current block is located at the boundary of a picture, a tile group, or a tile and belongs to the leftmost CTU.

FIG. 9 shows the search range of the current picture referencing for the current block, that is, the reference region.

FIG. 10 illustrates an embodiment in which the current picture 1000 is divided into a tile group A 1050 and a tile group B 1060. In this case, the tile group is one of the methods of dividing one picture, and a tile may also correspond to this. A tile group may consist of one or more tiles. Hereinafter, a tile group may be understood as one tile.

In FIG. 10, tile group A 1050 consists of 1001, 1002, 1006, 1007, 1011, and 1012 CTUs, and tile group B 1060 consists of 1003, 1004, 1005, 1008, 1009, 1010, 1013, 1014, and 1015 CTUs.

The pre-defined reference region for the current picture referencing may mean a partial region of the already reconstructed region 901 in the current picture 900 illustrated in FIG. 9. In addition, the partial region may be at least one of a current CTU including a current block, a left CTU or a top CTU spatially adjacent to the current CTU.

In particular, when the CTU including the current block is the leftmost CTU of the current picture, the current tile group, or the current tile, the CTU including the current block and the spatially adjacent top CTU may be referred to.

BLOCK A 1051 shown in FIG. 10 is an embodiment for a case in which the current block is included in the leftmost CTU of the current picture 1000. When the current block is a block included in BLOCK A 1051, the region that the current block can refer to in order to perform the current picture referencing may correspond to a region previously reconstructed according to the encoding and decoding order inside the current CTU (BLOCK A).

In addition to this, in the present disclosure, when the CTU including the current block is the leftmost CTU of the current picture 1000, the spatially adjacent top CTU 1006 is used as a reference region for the case where there is a spatially adjacent top CTU.

When there is no available CTU to the left of the CTU to which the current block belongs (hereinafter referred to as the current CTU), the current picture referencing may be performed using only the reconstructed region within the current CTU, or it may be set so that the current picture referencing is not performed. Alternatively, it may be set to refer to a specific region pre-reconstructed before the current CTU. The specific region may belong to the same tile or tile group, or may be P CTUs decoded immediately before the current CTU. P may be 1, 2, 3 or more. The N value may be a fixed value pre-defined in the encoding/decoding apparatus, or may be variably determined according to the position of the current block and/or the current CTU.

In addition, the CTU 207 on which encoding and decoding has been previously performed according to the encoding and decoding order may be used as a reference region.

BLOCK B 1061 shown in FIG. 10 is a CTU included in Tile group B which is a second tile group of the current picture 1000. It is an embodiment for a case in which it is located at the leftmost of Tile group B and is located at the tile group boundary. When the current block is a block included in the BLOCK B 1061, the region that the current block can refer to to perform the current picture referencing may correspond to a region reconstructed in advance according to the encoding and decoding order inside the current CTU (BLOCK B).

In addition to this, in the present disclosure, when the CTU including the current block is the leftmost CTU of the current tile group 1060, the spatially adjacent top CTU 1003 is used as a reference region for the case where there is a spatially adjacent top CTU.

In addition, the CTU 1005 on which encoding and decoding has been previously performed according to the encoding and decoding order is used as a reference region.

In addition, in the present disclosure, among the above descriptions, the concept of a tile group may be replaced with a concept of a tile.

In addition, in the present disclosure, when the CTU including the current block is a CTU located at the left boundary of a tile or a tile group, the CTU located to the left of the current CTU may be used as a reference region only when the current tile or tile group is a tile or tile group that allows prediction between tiles or tile groups. To this end, information on a prediction/reference relationship between tiles or tile groups may be encoded. For example, the information may include at least one of whether reference between tiles is allowed, whether a current tile refers to another tile, the number of tiles belonging to a picture, an index specifying the position of the tile, the number/position of referenced tiles, etc. The information may be signaled at least one level of a video sequence, a picture, a tile group, or a tile.

FIG. 11 illustrates an embodiment of a region including a current block and a searchable and referenceable region of a current picture referencing (CPR).

It has been shown that the current CTU is divided into a plurality of VPDUs. The VPDU means a maximum unit capable of performing encoding and decoding at once in order to reduce the cost of hardware implementation for the CTU as the size of the CTU increases. Here, the VPDU may mean a block having at least one of a width or a height less than a CTU. When the division depth of the CTU is k, the VPDU may be defined as a block having a division depth of (k+1) or (k+2). The shape of the VPDU may be a square or a non-square, but may be limited to a square if necessary.

In addition, the size of the VPDU may be a pre-defined arbitrary size or a size of one quarter of the CTU. In this case, as the pre-defined arbitrary size may be 64×64, 32×32, or 128×128.

FIG. 11 shows the CTU 1110 including the current block and the CTU 1100 spatially adjacent to the left. In this case, the search range for the current picture referencing of the current block, that is, the reference region may be pre-defined.

In particular, only when the current block is included in a first VPDU 1111 of the current CTU 1110, all or a partial region of all pixel regions of the CTU 1100 adjacent to the left may be used as the reference region. According to an embodiment illustrated in FIG. 11, a region previously reconstructed according to the encoding and decoding order among a second VPDU 1102, a third VPDU 1103, a fourth VPDU 1104 and VPDU 1111 including the current block except for a first VPDU 1101 of the CTU 1100 adjacent to the left may be used as a reference region.

As shown in FIG. 11, according to an embodiment of the present disclosure, when a spatially adjacent CTU is used as a search and reference region for a current picture referencing (CPR), only some regions of spatially adjacent CTUs may be used.

Only N CTUs encoded/decoded immediately before the current CTU according to the encoding/decoding order may be used. Alternatively, only M VPDUs encoded/decoded immediately before the current VPDU according to the encoding/decoding order may be used. Here, N and M may be integers of 1, 2, 3, 4, or more, and N and M may be the same as or different from each other. The number may be a value pre-defined in the encoding/decoding apparatus, or may be variably determined based on block availability. The M VPDUs may be limited to belonging to the same CTU (or tile, tile group). Alternatively, at least one of the M VPDUs may be limited to belonging to a different CTU (or tile, tile group) from the others. At least one of the above-mentioned limitations may be set in consideration of the location and/or scan order of the current block or current VPDU. Here, the location may be interpreted in various meanings, such as a location within a CTU, a location within a tile, and a location within a tile group. The above-described embodiment may be applied in the same/similar manner to the following embodiments as well.

FIG. 11 illustrates that a reference region in the CTU 1100 adjacent to the left is changed for a case in which the current block is included in a second VPDU 1112, a third VPDU 1113, and a fourth VPDU 1114 of the current CTU 1110, respectively.

When the current block is included in the second VPDU 1112 of the current CTU 1110, all pixel regions of the CTU 1100 adjacent to the left may not be used as reference regions, and only some regions may be used as reference regions. According to an embodiment illustrated in FIG. 11, the third VPDU 1103 and the fourth VPDU 1104 excluding the first VPDU 1101 and the second VPDU 1102 of the CTU 1100 adjacent to the left may be used as the reference region. Also, among the first VPDU 1111 of the current CTU 1110 and the second VPDU 1112 including the current block, a region previously reconstructed according to the encoding and decoding order may be used as the reference region.

In addition, when the current block is included in the third VPDU 1113 of the current CTU 1110, all pixel regions of the CTU 1100 adjacent to the left may not be used as reference regions, and only some regions may be used as reference regions. According to the embodiment shown in FIG. 11, except for the first VPDU 1101, the second VPDU 1102, and the third VPDU 1103 of the CTU 1100 adjacent to the left, the fourth VPDU 1104 may be used as the reference region. Also, among the first VPDU 1111 and the second VPDU 1112 of the current CTU 1110 and the third VPDU 1113 including the current block, a region previously reconstructed according to the encoding and decoding order may be used as the reference region.

In addition, when the current block is included in the fourth VPDU 1113 of the current CTU 1110, only the pre-reconstructed region inside the current CTU 1110 may be used as the reference region, without using the CTU 1100 adjacent to the left as the reference region.

Figure 12A:
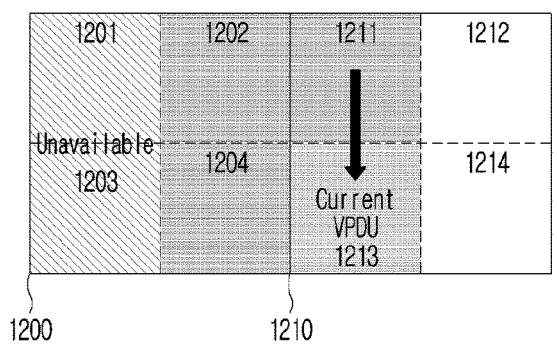
Figure 12B:
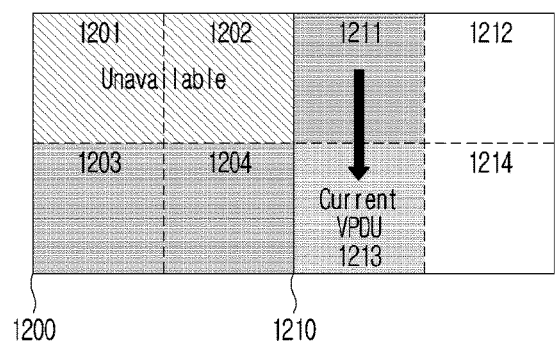
Figure 12C:
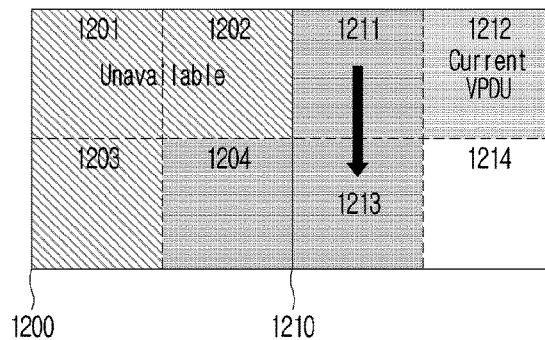

FIG. 12 illustrates another embodiment of a region including a current block and a searchable and referenceable region of a current picture referencing (CPR).

FIG. 12 illustrates an additional embodiment of a case in which the VPDU execution order is different from the existing z-scan order according to the division form of the current CTU 1210.

In a case where the current CTU 1210 is vertically divided and the VPDU execution order is the first VPDU 1211, the third VPDU 1213, the second VPDU 1212, and the fourth VPDU 1214, when the current block is currently included in the third VPDU 1213 of the CTU 1210, the second VPDU 1202 and the fourth VPDU 1204 except for the first VPDU 1201 and the third VPDU 1203 in the CTU 1200 adjacent to the left may be used as the reference region. In addition, a region previously reconstructed according to encoding and/or decoding order among the first VPDU 1211 of the current CTU 1210 and the third VPDU 1213 including the current block may be used as the reference region. In the above embodiment, it means that a region spatially adjacent to the current VPDU is referred to first among the left CTUs.

Additionally, according to the VPDU execution order, when the VPDU execution order is the first VPDU 1211, the third VPDU 1213, the second VPDU 1212, and the fourth VPDU 1214 due to vertical division in the left CTU, the reference region may be designated as in the above method (FIG. 12A).

Unlike the previous embodiment of FIG. 12A, when the current CTU 1210 is vertically divided so that the VPDU is performed in the order of the first VPDU 1211, the third VPDU 1213, the second VPDU 1212, and the fourth VPDU 1214 and the current block is included in the third VPDU 1213 of the current CTU 1210, the third VPDU 1203 and the fourth VPDU 1204 except for the first VPDU 1201 and the second VPDU 1202 of the CTU 1200 adjacent to the left may be used as the reference region. In addition, a region previously reconstructed according to the encoding and decoding order among the first VPDU 1211 of the current CTU 1210 and the third VPDU 1213 including the current block may be used as the reference region.

It means that the reference region may be designated as the above method (FIG. 12B) for the case where the VPDU execution order in the left CTU is the first VPDU 1211, the second VPDU 1212, the third VPDU 1213, and the fourth VPDU 1214.

In the above embodiment, a region encoded and decoded later according to the VPDU execution order of the left CTU may be first referenced.

In addition, in the case where the current CTU 1210 is vertically divided and the VPDUs are performed in the order of the first VPDU 1211, the third VPDU 1213, the second VPDU 1212, and the fourth VPDU 1214, when the current block is included in the second VPDU 1212 of the current CTU 1210, the fourth VPDU 1204 except for the first VPDU 1201, the second VPDU 1202, and the third VPDU 1203 of the CTU 1200 adjacent to the left may be used as the reference region. Also, a region previously reconstructed according to the encoding and decoding order among the first VPDU 1211 and the third VPDU 1213 of the current CTU 1210 and the second VPDU 1212 including the current block may be used as the reference region.

Figures 13A, 13B, 13C, 13D:
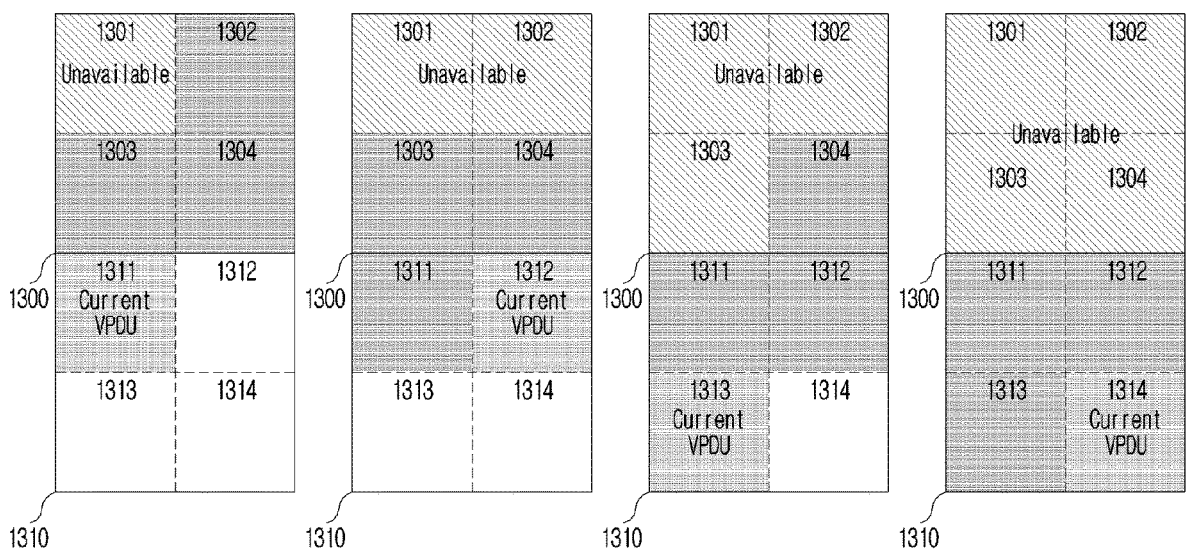

FIG. 13 illustrates another embodiment of a region including a current block and a searchable and referenceable region of a current picture referencing (CPR).

An embodiment of referring to a CTU located at the top among CTUs spatially adjacent to the current CTU is shown in FIG. 13 for the case where the CTU including the current block shown in FIG. 10 is located at the leftmost of the current picture, the current tile group, or the current tile, and the top CTU may be referred to.

Only when the current block is included in the first VPDU 1311 of the current CTU 1310, all pixel regions of the CTU 1300 adjacent to the top may not be used as reference regions, and only some regions may be used as reference regions. According to an embodiment illustrated in FIG. 13, among the second VPDU 1302, the third VPDU 1303, the fourth VPDU 1304, and the VPDU 1311 including the current block except for the first VPDU 1301 of the CTU 1300 adjacent to the top, a region previously reconstructed according to the encoding and decoding order may be used as the reference region.

When the current block is included in the second VPDU 1312 of the current CTU 1310, all the pixel regions of the CTU 1300 adjacent to the top may not be used as the reference region, and only some regions may be used as the reference region. According to the embodiment shown in FIG. 13, the third VPDU 1303 and the fourth VPDU 1304 except for the first VPDU 1301 and the second VPDU 1302 of the CTU 1300 adjacent to the top may be used as the reference region. In addition, a region previously reconstructed according to the encoding and decoding order among the first VPDU 1311 of the current CTU 1310 and the second VPDU 1312 including the current block may be used as the reference region.

In addition, when the current block is included in the third VPDU 1313 of the current CTU 1310, all pixel regions of the CTU 1300 adjacent to the top may not be used as reference regions, and only some regions may be used as reference regions. According to the embodiment shown in FIG. 13, except for the first VPDU 1301, the second VPDU 1302, and the third VPDU 1303 of the CTU 1300 adjacent to the top, the fourth VPDU 1304 may be used as the reference region. Also, among the first VPDU 1311, the second VPDU 1312 of the current CTU 1310, and the third VPDU 1313 including the current block, a region previously reconstructed according to the encoding and decoding order may be used as the reference region.

In addition, when the current block is included in the fourth VPDU 1313 of the current CTU 1310, only the pre-reconstructed region inside the current CTU 1310 may be used as the reference region, without using the CTU 1300 adjacent to the top as the reference region.

Figure 14A:
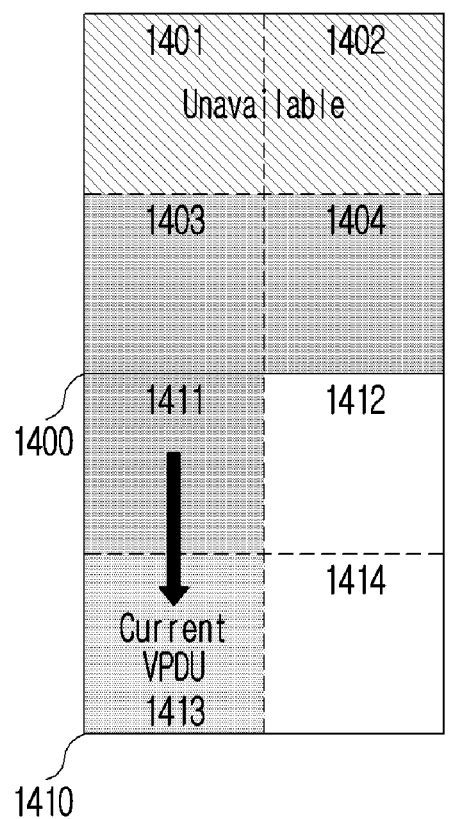
Figure 14B:
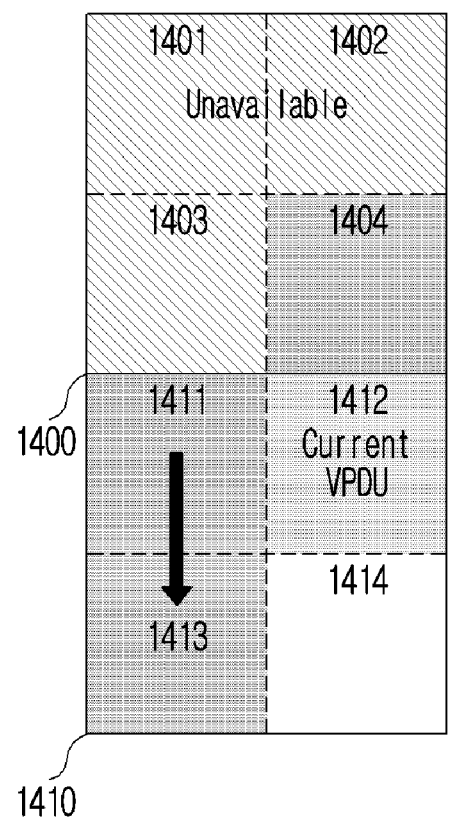

FIG. 14 illustrates another embodiment of a region including a current block and a searchable and referenceable region of a current picture referencing (CPR).

In FIG. 14, in addition to FIG. 13, an additional embodiment is shown in which the current block refers to a partial region of the CTU 1400 that is spatially adjacent to the top for a case where the VPDU execution order is different from the existing z-scan order according to the division form of the current CTU 1410.

In a case where the current CTU 1410 is vertically divided and the VPDUs are performed in the order of the first VPDU 1411, the third VPDU 1413, the second VPDU 1412, and the fourth VPDU 1414, when the current block is included in the third VPDU 1413 of the CTU 1410, the third VPDU 1403 and the fourth VPDU 1404 except for the first VPDU 1401 and the second VPDU 1402 of the CTU 1400 adjacent to the top may be used as the reference region. Also, among the first VPDU 1411 of the current CTU 1410 and the third VPDU 1413 including the current block, a region previously reconstructed according to the encoding and decoding order may be used as the reference region.

In addition, in the case where the current CTU 1410 is vertically divided and the VPDUs are performed in the order of the first VPDU 1411, the third VPDU 1413, the second VPDU 1412, and the fourth VPDU 1414, when the current block is included in the second VPDU 1412 of the current CTU 1410, the fourth VPDU 1404 except for the first VPDU 1401, the second VPDU 1402, and the third VPDU 1403 of the CTU 1400 adjacent to the top may be used as the reference region. Also, among the first VPDU 1411, the third VPDU 1413 of the current CTU 1410, and the second VPDU 1412 including the current block, a region previously reconstructed according to the encoding and decoding order may be used as the reference region.

As described above, the current block may set the reference region based on the CTU located in at least one of the left or the top of the current CTU. That is, the left or top CTU may be selectively used, and the selection may be performed based on predetermined encoding information. The encoding information may include information on whether the left or top CTU is referenced, whether the left or top CTU is available, the scan order, the location of the current VPDU within the current CTU, and the like.

Figure 15:
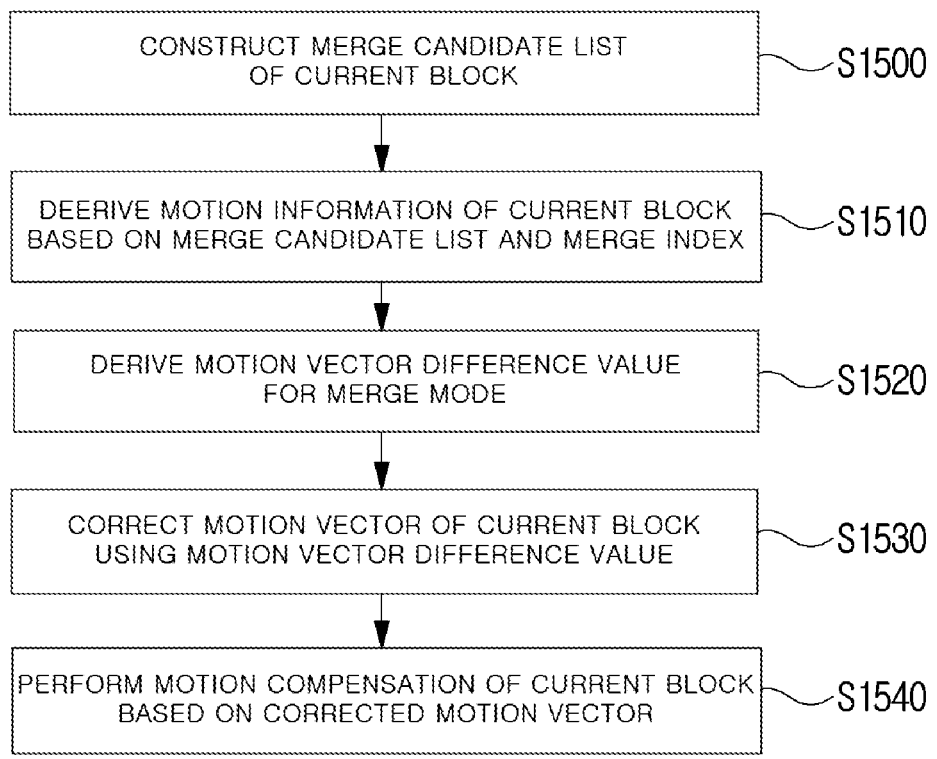
FIG. 15 illustrates an image encoding/decoding method using a merge mode based on a motion vector difference value (MVD) as an embodiment to which the present disclosure is applied.

FIG. 15 illustrates an image encoding/decoding method using a merge mode based on a motion vector difference value (MVD) as an embodiment to which the present disclosure is applied.

The merge mode uses motion information of the neighboring block equally as motion information of the current block, and unlike the AMVP mode, it does not require encoding/decoding of a separate motion vector difference value. However, even in the merge mode, a predetermined motion vector difference value (MVD) may be used to improve motion vector accuracy. In the present disclosure, motion information may be understood to include at least one of a motion vector, a reference picture index, or prediction direction information.

The MVD may be selectively used based on a predetermined flag (hereinafter, MVD_flag). MVD_flag may indicate whether a motion vector difference value (MVD) is used in the merge mode. For example, if the flag is a first value, the motion vector difference value is used in the merge mode, otherwise, the motion vector difference value is not used in the merge mode. That is, when the flag is the first value, the motion vector derived according to the merge mode may be corrected using the motion vector difference value, and when the flag is not the first value, the motion vector according to the merge mode may not be corrected.

The MVD_flag may be encoded/decoded only when at least one of a width or a height of the current block is greater than or equal to 8. Alternatively, the MVD_flag may be encoded/decoded only when the number of pixels belonging to the current block is greater than or equal to 64. Alternatively, MVD_flag may be encoded/decoded only when the sum of the width and height of the current block is greater than 12.

Referring to FIG. 15, a merge candidate list of the current block may be constructed (S1500).

The merge candidate list may include one or a plurality of merge candidates available for deriving motion information of the current block. The size of the merge candidate list may be variably determined based on information indicating the maximum number of merge candidates constituting the merge candidate list (hereinafter, size information). The size information may be encoded and signaled by the encoding apparatus, or may be a fixed value (e.g., an integer of 2, 3, 4, 5, 6 or more) pre-promised to the decoding apparatus.

A plurality of merge candidates belonging to the merge candidate list may include at least one of a spatial merge candidate or a temporal merge candidate.

The spatial merge candidate may mean a neighboring block spatially adjacent to the current block or motion information of the neighboring block. Here, the neighboring block may include at least one of the bottom-left block A0, the left block A1, the top-right block B0, the top block B1, or the top-left block B2 of the current block. According to a predetermined priority order, available neighboring blocks among the neighboring blocks may be sequentially added to the merge candidate list. For example, the priority such as B1->A1->B0->A1->B2, A1->B1->A0->B1->B2, A1->B1->B0->A0->B2, etc. may be defined, but is not limited thereto.

The temporal merge candidate may mean one or more co-located blocks belonging to a co-located picture or motion information of the co-located blocks. Here, the co-located picture may be any one of a plurality of reference pictures belonging to the reference picture list, which may be a different picture from the picture to which the current block belongs. The co-located picture may be the first picture or the last picture in the reference picture list. Alternatively, the co-located picture may be specified based on an index encoded to indicate the co-located picture. The co-located block may include at least one of a block C1 including the center position of the current block or a neighboring block C0 adjacent to the bottom-right corner of the current block. According to a predetermined priority order, an available block among C0 and C1 may be sequentially added to the merge candidate list. For example, C0 may have a higher priority than C1. However, the present disclosure is not limited thereto, and C1 may have a higher priority than C0.

The encoding/decoding apparatus may include a buffer for storing motion information of one or more blocks (hereinafter, referred to as previous blocks) that have been encoded/decoded before the current block. In other words, the buffer may store a list composed of motion information of the previous blocks (hereinafter, a motion information list).

The motion information list may be initialized in units of any one of a picture, a slice, a tile, a CTU row, or a CTU. Initialization may mean a state in which the motion information list is empty. Motion information of the corresponding previous block may be sequentially added to the motion information list according to the encoding/decoding order of the previous block, and the motion information list may be updated in a first-in first-out (FIFO) manner in consideration of the size of the motion information list. For example, when the most recently encoded/decoded motion information (hereinafter, the latest motion information) is the same as the pre-added motion information to the motion information list, the latest motion information may not be added to the motion information list. Alternatively, the same motion information as the latest motion information may be removed from the motion information list, and the latest motion information may be added to the motion information list. In this case, the latest motion information may be added to the last position of the motion information list or added to the position of the removed motion information.

The previous block may include at least one of one or more neighboring blocks spatially adjacent to the current block or one or more neighboring blocks not spatially adjacent to the current block.

In the merge candidate list, a previous block belonging to a buffer or a motion information list or motion information of the previous block may be further added as a merge candidate.

Specifically, a redundancy check between the motion information list and the merge candidate list may be performed. The redundancy check may be performed on all or some of merge candidates belonging to the merge candidate list and all or some of the previous blocks in the motion information list. However, for convenience of description, it is assumed that the redundancy check of the present disclosure is performed on some of merge candidates belonging to the merge candidate list and some of previous blocks in the motion information list. Here, some merge candidates in the merge candidate list may include at least one of a left block or a top block among spatial merge candidates. However, the present disclosure is not limited thereto, and some merge candidates may be limited to any one of spatial merge candidates, and may further include at least one of a bottom-left block, a top-right block, a top-left block, or a temporal merge candidate. Some previous blocks of the motion information list may mean K previous blocks recently added to the motion information list. Here, K may be 1, 2, 3, or more, and may be a fixed value pre-promised to the encoding/decoding apparatus.

For example, it is assumed that 5 previous blocks (or motion information of the previous block) are stored in the motion information list, and an index of 1 to 5 is assigned to each previous block. The larger the index, the more recently stored previous block. In this case, it is possible to check the redundancy of motion information between the previous blocks having indices 5, 4, and 3 and some merge candidates in the merge candidate list. Alternatively, redundancy between the previous blocks having indices 5 and 4 and some merge candidates in the merge candidate list may be checked. Alternatively, the redundancy between the previous blocks having indices 4 and 3 except for the most recently added previous block of index 5 and some merge candidates in the merge candidate list may be checked.

As a result of the redundancy check, if at least one previous block having the same motion information exists, the previous block of the motion information list may not be added to the merge candidate list. On the other hand, when there is no previous block having the same motion information, all or some of the previous blocks of the motion information list may be added to the last position of the merge candidate list. In this case, it may be added to the merge candidate list in the order of the previous blocks recently added in the motion information list (i.e., from the largest index to the smallest). However, the previous block most recently added to the motion information list (i.e., the previous block having the largest index) may be limited not to be added to the merge candidate list. The addition of the previous block may be performed in consideration of the size of the merge candidate list. For example, it is assumed that the merge candidate list has the maximum number (T) of merge candidates according to the size information of the merge candidate list described above. In this case, the addition of the previous block may be limited to be performed only until the number of merge candidates belonging to the merge candidate list becomes (T−n). Here, n may be an integer of 1, 2, or more. Alternatively, the addition of the previous block may be repeatedly performed until the number of merge candidates included in the merge candidate list is T.

Referring to FIG. 15, motion information of the current block may be derived based on the merge candidate list and the merge index (merge_idx) (S1510).

The merge index may specify any one of a plurality of merge candidates belonging to the merge candidate list. The motion information of the current block may be set as motion information of a merge candidate specified by the merge index.

According to the value of MVD_flag, the maximum number of merge candidates available for the current block may be adaptively determined. If MVD_flag is 0, up to M merge candidates may be used, while if MVD_flag is 1, N merge candidates may be used. Here, M may be a natural number less than N.

For example, when MVD_flag is 1, the signaled merge index may have a value of 0 or 1. That is, when the motion vector difference value is used in the merge mode, the motion information of the current block may be derived using only one of the first merge candidate (merge_idx=0) or the second merge candidate (merge_idx=1) of the merge candidate list.

Accordingly, even when the maximum number of merge candidates belonging to the merge candidate list is M, the maximum number of merge candidates available for the current block may be two if the motion vector difference value is used in the merge mode.

Alternatively, when MVD_flag is 1, the merge index is not encoded/decoded, and instead, the use of the first merge candidate may be forced by setting the merge index to 0. Alternatively, when MVD_flag is 1, the merge index may have a value between 0 and i, i may be an integer of 2, 3, or more, and i may be equal to (M−1).

Referring to FIG. 15, a motion vector difference value (MVD) for the merge mode of the current block may be derived (S1520).

The MVD of the current block may be derived based on a merge offset vector (offsetMV). The MVD includes at least one of MVD (MVD0) in the L0 direction or MVD (MVD1) in the L1 direction, and each of MVD0 and MVD1 may be derived using a merge offset vector.

The merge offset vector may be determined based on a length (mvdDistance) and a direction (mvdDirection) of the merge offset vector. For example, the merge offset vector offsetMV may be determined as in Equation 7 below.

offsetMV[x0][y0][0]=(mvdDistance[x0][y0]<<2)* mvdDirection[x0][y0][0]offsetMV[x0][y0][1]= (mvdDistance[x0][y0]<<2)*mvdDirection[x0] [y0][1]     [Equation 7]

Here, mvdDistance may be determined in consideration of at least one of a distance index (distance_idx) or a predetermined flag (pic_fpel_mmvd_enabled_flag). The distance index (distance_idx) may mean an index encoded to specify a length or a distance of a motion vector difference value (MVD). pic_fpel_mmvd_enabled_flag may indicate whether a motion vector uses integer pixel precision in the merge mode of the current block. For example, when pic_fpel_mmvd_enabled_flag is a first value, the merge mode of the current block uses integer pixel precision. That is, this may mean that the motion vector resolution of the current block is an integer pel. On the other hand, when pic_fpel_mmvd_enabled_flag is a second value, the merge mode of the current block may use fractional pixel precision. In other words, when pic_fpel_mmvd_enabled_flag is the second value, the merge mode of the current block may use integer pixel precision or fractional pixel precision. Alternatively, when pic_fpel_mmvd_enabled_flag is the second value, the merge mode of the current block may be limited to use only fractional pixel precision. Examples of fractional pixel precision may include ½ pel, ¼ pel, ⅛ pel, and the like.

For example, mvdDistance may be determined as shown in Table 3 below.

TABLE 3

| | MmvdDistance[x0][y0] | |
| --- | --- | --- |
| distance_idx [x0][y0] | pic_fpel_mmvd_enabled_flag == 0 | pic_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Also, mvdDirection indicates the direction of the merge offset vector and may be determined based on the direction index (direction_idx). Here, the direction may include at least one of left, right, top, bottom, top-left, bottom-left, top-right, or bottom-right. For example, mvdDirection may be determined as shown in Table 4 below.

TABLE 4

| direction_idx[x0][y0] | mvdDistance[x0][y0][0] | mvdDirection[x0][y0][1] |
|---|---|---|
| 0 | +1 | 0 |
| 1 | −1 | 0 |
| 2 | 0 | +1 |
| 3 | 0 | −1 |

In Table 4, mvdDirection[x0][y0][0] may mean the sign of the x component of the motion vector difference value, and mvdDirection[x0][y0][1] may mean the sign of the y component of the motion vector difference value. When direction_idx is 0, the direction of the motion vector difference value may be determined as the right direction, when direction_idx is 1, the direction of the motion vector difference value may be determined as the left direction, when direction_idx is 2, the direction of the motion vector difference value may be determined as the bottom direction, and when direction_idx is 3, the direction of the motion vector difference value may be determined as the top direction.

The aforementioned distance index and direction index may be encoded/decoded only when MVD_flag is the first value.

Meanwhile, the motion vector difference value (MVD) may be set to be the same as the previously determined merge offset vector. Alternatively, the merge offset vector may be corrected in consideration of the POC difference (PocDiff) between the reference picture of the current block and the current picture to which the current block belongs, and the corrected merge offset vector may be set as a motion vector difference value (MVD). In this case, the current block may be encoded/decoded with bi-prediction, and the reference picture of the current block may include a first reference picture (reference picture in L0 direction) and a second reference picture (reference picture in L1 direction). For convenience of description, the POC difference between the first reference picture and the current picture will be referred to as PocDiff0, and the POC difference between the second reference picture and the current picture will be referred to as PocDiff1.

When PocDiff0 and PocDiff1 are the same, MVD0 and MVD1 of the current block may be identically set as merge offset vectors, respectively.

In the case where PocDiff0 and PocDiff1 are not the same, when the absolute value of PocDiff0 is greater than or equal to the absolute value of PocDiff1, MVD0 may be identically set as the merge offset vector. Meanwhile, MVD1 may be derived based on a preset MVD0. For example, when the first and second reference pictures are long-term reference pictures, MVD1 may be derived by applying a first scaling factor to MVD0. The first scaling factor may be determined based on PocDiff0 and PocDiff1. On the other hand, when at least one of the first and second reference pictures is a short-term reference picture, MVD1 may be derived by applying a second scaling factor to MVD0. The second scaling factor may be a fixed value (e.g., −½, −1, etc.) pre-promised to the encoding/decoding apparatus. However, the second scaling factor may be applied only when the sign of PocDiff0 and the sign of PocDiff1 are different from each other. If the sign of PocDiff0 and the sign of PocDiff1 are the same, MVD1 may be set to be the same as MVD0, and separate scaling may not be performed.

Meanwhile, in the case where PocDiff0 and PocDiff1 are not the same, when the absolute value of PocDiff0 is less than the absolute value of PocDiff1, MVD1 may be identically set as the merge offset vector. Meanwhile, MVD0 may be derived based on a preset MVD1. For example, when the first and second reference pictures are long-term reference pictures, MVD0 may be derived by applying a first scaling factor to MVD1. The first scaling factor may be determined based on PocDiff0 and PocDiff1. On the other hand, when at least one of the first and second reference pictures is a short-term reference picture, MVD0 may be derived by applying a second scaling factor to MVD1. The second scaling factor may be a fixed value (e.g., −½, −1, etc.) pre-promised to the encoding/decoding apparatus. However, the second scaling factor may be applied only when the sign of PocDiff0 and the sign of PocDiff1 are different from each other. If the sign of PocDiff0 and the sign of PocDiff1 are the same, MVD0 may be set to be the same as MVD1, and separate scaling may not be performed.

Referring to FIG. 15, a motion vector of the current block may be corrected using a motion vector difference value (MVD) (S1530), and motion compensation of the current block may be performed based on the corrected motion vector (S1540).

FIGS. 16 to 21 illustrate a method of determining an inter prediction mode of a current block based on a predetermined priority according to an embodiment to which the present disclosure is applied.

The present disclosure relates to a method and apparatus of parsing encoding information related to a merge mode in a coding block encoded in a skip mode and/or a merge mode among video coding techniques.

When the current encoding and/or decoding block is encoded and/or decoded in the skip or merge mode, a plurality of prediction methods may be used, and a method for efficiently signaling the plurality of prediction methods is required. In signaling and parsing the merge mode related encoding information of the current encoding and/or decoding block, the order of signaling and parsing syntax may be determined according to the order of occurrence frequency among a plurality of prediction methods.

The plurality of prediction methods may include at least one of a block unit merge mode, a general CU unit merge mode (regular merge mode or CU merge mode), MMVD (MVD-based merge mode), a subblock unit merge mode, a combined prediction mode, a non-rectangular prediction mode, or a current picture referencing mode.

In addition, a method of signaling and parsing each corresponding syntax, a condition for this, or a case in which the corresponding syntax is not expressed (or not signaled) will be described below through a syntax table and semantics of each syntax. However, redundant descriptions will be omitted.

Referring to FIG. 16, regular_merge_flag may indicate whether a general CU unit merge mode is used to generate an inter prediction parameter of a current block. When regular_merge_flag is not signaled, regular_merge_flag may be set to 0.

mmvd_flag[x0][y0] may indicate whether an MVD-based merge mode is used to generate the inter prediction parameter of the current block. Here, mmvd_flag[x0][y0] may be interpreted as the same meaning as the aforementioned MVD_flag. When mmvd_flag is not signaled, mmvd_flag may be derived based on at least one of whether the current block is a block coded in the current picture referencing mode or regular_merge_flag. For example, if the current block is not a block coded in the current picture referencing mode and regular_merge_flag is not 1, mmvd_flag may be derived as 1, otherwise, mmvd_flag may be derived as 0.

merge_subblock_flag may indicate whether an inter prediction parameter in units of sub-blocks for the current block is derived from a neighboring block. When merge_subblock_flag is not signaled, merge_subblock_flag may be derived based on at least one of sps_ciip_enabled_flag or sps_triangle_enabled_flag. Here, sps_ciip_enabled_flag may indicate whether encoding information (e.g., ciip_flag) regarding the combined prediction mode is present, and sps_triangle_enabled_flag may indicate whether non-rectangular partition-based motion compensation may be used.

For example, if at least one of sps_ciip_enabled_flag or sps_triangle_enabled_flag is 0, merge_subblock_flag may be derived as 1, otherwise, merge_subblock_flag may be derived as 0.

ciip_flag may indicate whether the combined prediction mode is applied to the current block. If ciip_flag is not signaled, ciip_flag may be derived based on sps_triangle_enabled_flag. For example, when sps_triangle_enabled_flag is 0, ciip_flag may be derived as 1, otherwise, ciip_flag may be derived as 0.

merge_triangle_flag may indicate whether non-rectangular partition-based motion compensation is used for the current block. When merge_triangle_flag is not signaled, merge_triangle_flag may be derived based on at least one of sps_triangle_enabled_flag or ciip_flag. For example, if sps_triangle_enabled_flag is 1 and ciip_flag is 0, merge_triangle_flag may be derived as 1, otherwise, merge_triangle_flag may be derived as 0.

cu_skip_flag may indicate whether the current block is a block coded in the skip mode. For example, when cu_skip_flag=1, no syntax is parsed except for the following syntax for the current block. When cu_skip_flag is not signaled, cu_skip_flag may be derived as 0.

Flag indicating the combined prediction mode (pred_mode_ibc_flag)
Flag indicating MVD-based merge mode (mmvd_flag)
Merge index in MVD-based merge mode (mmvd_merge_flag)
Distance index in MVD-based merge mode (mmvd distance_idx)
Direction index in MVD-based merge mode (mmvd_direction_idx)
Merge index (merge_idx)
merge_subblock_flag
Merge index in sub-block unit merge mode (merge_subblock_idx)
Split direction indicator for non-rectangular partitions (merge_triangle_split_dir)
Merge index of non-rectangular partition (merge_triangle_idx)

Referring to FIG. 17, regular_merge_flag may indicate whether a general CU unit merge mode is used to generate an inter prediction parameter of the current block. When regular_merge_flag is not signaled, regular_merge_flag may be derived in consideration of whether the current block is a block coded in the current picture referencing mode. For example, if the current block is a block coded in the current picture referencing mode, regular_merge_flag may be derived as 1, otherwise regular_merge_flag may be derived as 0.

Referring to FIG. 18, regular_merge_flag may indicate whether a general CU unit merge mode is used to generate an inter prediction parameter of a current block. When regular_merge_flag is not signaled, regular_merge_flag may be set to 0.

mmvd_flag[x0][y0] may indicate whether an MVD-based merge mode is used to generate the inter prediction parameter of the current block. Here, mmvd_flag[x0][y0] may be interpreted as the same meaning as the aforementioned MVD_flag.

When mmvd_flag is not signaled, mmvd_flag may be derived based on at least one of whether the current block is a block coded in the current picture referencing mode or regular_merge_flag. For example, if the current block is not a block coded in the current picture referencing mode and regular_merge_flag is not 1, mmvd_flag may be derived as 1, otherwise, mmvd_flag may be derived as 0.

Alternatively, when mmvd_flag is not signaled, mmvd_flag may be derived based on at least one of whether the current block is a block coded in the current picture referencing mode, regular_merge_flag, or the size of the current block. For example, if the current block is not a block coded in the current picture referencing mode, regular_merge_flag is not 1, and the sum of the width and height of the current block is less than or equal to 12, mmvd_flag is derived as 1, otherwise, mmvd_flag may be derived as 0.

merge_subblock_flag may indicate whether an inter prediction parameter in units of sub-blocks for the current block is derived from a neighboring block. When merge_subblock_flag is not signaled, merge_subblock_flag may be derived based on at least one of sps_ciip_enabled_flag or sps_triangle_enabled_flag. Here, sps_ciip_enabled_flag may indicate whether encoding information (e.g., ciip_flag) regarding the combined prediction mode is present, and sps_triangle_enabled_flag may indicate whether non-rectangular partition-based motion compensation may be used.

For example, if at least one of sps_ciip_enabled_flag or sps_triangle_enabled_flag is 0, merge_subblock_flag may be derived as 1, otherwise, merge_subblock_flag may be derived as 0.

ciip_flag may indicate whether the combined prediction mode is applied to the current block. When ciip_flag is not signaled, ciip_flag may be derived based on at least one of sps_triangle_enabled_flag or a slice type. For example, if sps_triangle_enabled_flag is 0 or the slice to which the current block belongs is not a B slice, ciip_flag may be derived as 1, otherwise, ciip_flag may be derived as 0.

merge_triangle_flag may indicate whether non-rectangular partition-based motion compensation is used for the current block. When merge_triangle_flag is not signaled, merge_triangle_flag may be derived based on at least one of sps_triangle_enabled_flag or ciip_flag. For example, if sps_triangle_enabled_flag is 1 and ciip_flag is 0, merge_triangle_flag may be derived as 1, otherwise, merge_triangle_flag may be derived as 0.

cu_skip_flag may indicate whether the current block is a block coded in the skip mode. For example, when cu_skip_flag is equal to 1, no syntax is parsed except for the following syntax for the current block. When cu_skip_flag is not signaled, cu_skip_flag may be derived as 0.

Flag indicating the combined prediction mode (pred_mode_ibc_flag)
Flag indicating MVD-based merge mode (mmvd_flag)
Merge index in MVD-based merge mode (mmvd_merge_flag)
Distance index in MVD-based merge mode (mmvd distance_idx)
Direction index in MVD-based merge mode (mmvd_direction_idx)
Merge index (merge_idx)
merge_subblock_flag
Merge index in sub-block unit merge mode (merge_subblock_idx)

Split direction indicator for non-rectangular partitions (merge_triangle_split_dir)

Merge index of non-rectangular partition (merge_triangle_idx)

Referring to FIG. 19, regular_merge_flag may indicate whether a general CU unit merge mode is used to generate an inter prediction parameter of the current block. When regular_merge_flag is not signaled, regular_merge_flag may be derived in consideration of whether the current block is a block coded in the current picture referencing mode. For example, if the current block is a block coded in the current picture referencing mode, regular_merge_flag may be derived as 1, otherwise regular_merge_flag may be derived as 0.

The encoding apparatus may generate a bitstream by encoding at least one of the above-described merge mode related encoding information according to a predetermined priority. The decoding apparatus may decode the bitstream to obtain merge mode related encoding information, and perform inter prediction according to the obtained encoding information.

Various embodiments of the present disclosure are not listed as listing all possible combinations, but are intended to describe representative aspects of the present disclosure, and matters described in the various embodiments may be applied independently or may be applied in combination of two or more.

In addition, various embodiments of the present disclosure may be implemented by hardware, firmware, software, or a combination thereof. In the case of implementation by hardware, it can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontroller, microprocessor, etc.

The scope of the present disclosure includes software or machine-executable instructions (e.g., operating system, application, firmware, program, etc.) that allow an operation according to a method of various embodiments to be executed on a device or a computer, and a non-transitory computer-readable medium in which the software or instructions are stored and executed on a device or a computer.

INDUSTRIAL AVAILABILITY

The present disclosure may be used to encode/decode an image signal.

The invention claimed is:

1. A method of decoding an image signal including a current picture with a decoding apparatus, comprising:
reconstructing, with the decoding apparatus, the current picture; and
performing, with the decoding apparatus, deblocking filtering on a boundary between a first block and a second block belonging to the reconstructed current picture,
wherein the deblocking filtering is performed based on one of a plurality of filter types pre-defined in the decoding apparatus,
wherein the plurality of filter types include a long filter and a short filter,
wherein a filter length of the long filter is m, and a filter length of the short filter is n,
wherein a value of m is 8, 10, 12 or 14, and a value of n is a natural number less than the value of m,
wherein, in response to the deblocking filtering based on the long filter, a filtered pixel in the first block is derived using X pixels belonging to the first block and Y pixels belonging to the second block,
wherein, in response to the long filter being symmetrically applied to the boundary between the first block and the second block, a value of X and a value of Y are 5, 6, or 7, and the value of X is equal to the value of Y,
wherein, in response to the long filter being asymmetrically applied to the boundary between the first block and the second block, one of the value of X or the value of Y is 3 and the other of the value of X or the value of Y is 7,
wherein the filtered pixel is derived through a weighted average between a first reference value and a second reference value,
wherein the first reference value is derived using the X pixels belonging to the first block and the Y pixels belonging to the second block, and
wherein the second reference value is derived as an average value of a first pixel farthest from the boundary among the X pixels belonging to the first block and a second pixel adjacent to the first pixel.

2. The method of claim 1, wherein the deblocking filtering is performed in units of one of a 4×4 sample grid or an 8×8 sample grid.

3. The method of claim 2, wherein the second pixel does not belong to the X pixels.

4. The method of claim 3, wherein a weight applied to the first reference value or the second reference value is derived based on one of a plurality of weight sets pre-defined in the decoding apparatus, and
wherein the plurality of weight sets include {59, 50, 41, 32, 23, 14, 5}, {58, 45, 32, 19, 6}, and {53, 32, 11}.

5. The method of claim 4, wherein the one of the plurality of weight sets is selected based on the value of X which is a number of the pixels of the first block used to derive the first reference value.

6. A method of encoding an image signal including a current picture with an encoding apparatus, comprising:
reconstructing, with the encoding apparatus, the current picture; and
performing, with the encoding apparatus, deblocking filtering on a boundary between a first block and a second block belonging to the reconstructed current picture,
wherein the deblocking filtering is performed based on one of a plurality of filter types pre-defined in the encoding apparatus,
wherein the plurality of filter types include a long filter and a short filter,
wherein a filter length of the long filter is m, and a filter length of the short filter is n,
wherein a value of m is 8, 10, 12 or 14, and a value of n is a natural number less than the value of m,
wherein, in response to the deblocking filtering based on the long filter, a filtered pixel in the first block is derived using X pixels belonging to the first block and Y pixels belonging to the second block,
wherein, in response to the long filter being symmetrically applied to the boundary between the first block and the second block, a value of X and a value of Y are 5, 6, or 7, and the value of X is equal to the value of Y,
wherein, in response to the long filter being asymmetrically applied to the boundary between the first block and the second block, one of the value of X or the value of Y is 3 and the other of the value of X or the value of Y is 7, wherein the filtered pixel is derived through a weighted average between a first reference value and a second reference value, wherein the first reference value is derived using the X pixels belonging to the first block and the Y pixels belonging to the second block, and wherein the second reference value is derived as an average value of a first pixel farthest from the boundary among the X pixels belonging to the first block and a second pixel adjacent to the first pixel.

7. A non-transitory computer-readable medium for storing data associated with an image signal, comprising:
- a data stream stored in the non-transitory computer-readable medium, the data stream comprising coding information of a current picture,
- wherein the current picture is reconstructed based on the coding information,
- wherein deblocking filtering is performed on a boundary between a first block and a second block belonging to the reconstructed current picture,
- wherein the deblocking filtering is performed based on one of a plurality of filter types,
- wherein the plurality of filter types include a long filter and a short filter,
- wherein a filter length of the long filter is m, and a filter length of the short filter is n,
- wherein a value of m is 8, 10, 12 or 14, and a value of n is a natural number less than the value of m,
- wherein, in response to the deblocking filtering based on the long filter, a filtered pixel in the first block is derived using X pixels belonging to the first block and Y pixels belonging to the second block,
- wherein, in response to the long filter being symmetrically applied to the boundary between the first block and the second block, a value of X and a value of Y are 5, 6, or 7, and the value of X is equal to the value of Y,
- wherein, in response to the long filter being asymmetrically applied to the boundary between the first block and the second block, one of the value of X or the value of Y is 3 and the other of the value of X or the value of Y is 7,
- wherein the filtered pixel is derived through a weighted average between a first reference value and a second reference value,
- wherein the first reference value is derived using the X pixels belonging to the first block and the Y pixels belonging to the second block, and
- wherein the second reference value is derived as an average value of a first pixel farthest from the boundary among the X pixels belonging to the first block and a second pixel adjacent to the first pixel.

* * * * *